(12) United States Patent
Nakamura

(10) Patent No.: US 12,470,107 B2
(45) Date of Patent: Nov. 11, 2025

(54) DRIVE DEVICE

(71) Applicant: DENSO CORPORATION, Kariya (JP)

(72) Inventor: Ryosuke Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 18/490,634

(22) Filed: Oct. 19, 2023

(65) Prior Publication Data
US 2024/0048016 A1 Feb. 8, 2024

Related U.S. Application Data

(63) Continuation of application No. PCT/JP2022/014947, filed on Mar. 28, 2022.

(30) Foreign Application Priority Data

Apr. 22, 2021 (JP) .................. 2021-072854

(51) Int. Cl.
H02K 5/04 (2006.01)
H02K 11/33 (2016.01)
B62D 5/04 (2006.01)

(52) U.S. Cl.
CPC ............... *H02K 5/04* (2013.01); *H02K 11/33* (2016.01); *B62D 5/0406* (2013.01); *H02K 2211/03* (2013.01)

(58) Field of Classification Search
CPC ...... H02K 5/04; H02K 11/33; H02K 2211/03; B62D 5/0406
See application file for complete search history.

(56) References Cited

U.S. PATENT DOCUMENTS

| 9,723,740 B2* | 8/2017 | Yang ..................... B60R 16/023 |
| 2012/0161590 A1 | 6/2012 | Yamasaki et al. |
| 2016/0165736 A1* | 6/2016 | Tsuboi ................... H02K 11/33 |
| | | 174/50.54 |
| 2020/0195098 A1 | 6/2020 | Shimakawa et al. |
| 2020/0366151 A1 | 11/2020 | Nakamura et al. |

FOREIGN PATENT DOCUMENTS

| JP | S61-205199 A | 12/1986 |
| JP | H11-017376 A | 1/1992 |
| JP | 2021-061653 A | 4/2021 |

* cited by examiner

*Primary Examiner* — Sean Gugger
(74) *Attorney, Agent, or Firm* — Maschoff Brennan

(57) ABSTRACT

A drive device of a motor comprises an electric component, a base member and a cover member. The base member and the cover member forms a cavity which accommodates the electric component. The base member and the cover member are connected by a plurality of connecting portions each of which includes a hooking portion and an anchoring portion. The base member further includes a plurality of protrusions which come in contact with an inner surface of the cover member. The protrusions includes a first protrusion and a second protrusion protruding in an opposite direction.

8 Claims, 17 Drawing Sheets

DRIVE DEVICE

CROSS REFERENCE TO RELATED APPLICATIONS

The present application is a continuation application of International Patent Application No. PCT/JP2022/014947 filed on Mar. 28, 2022, which designated the U.S. and is based on and claims the benefit of priority from Japanese Patent Application No. 2021-072854 filed on Apr. 22, 2021, and all the contents of the application are incorporated by reference.

TECHNICAL FIELD

The disclosure herein relates to a drive device having a base member and a cover member.

BACKGROUND

A drive device for an electric motor has a base member as a member of a motor housing and a cover member. The base member and the cover member define a cavity for accommodating an electric component. The cover member should be placed on a proper position with respect to the base member to enable a sure protection of the electric component and to enable a proper function of the electric component. In the above aspects, or in other aspects not mentioned, there is a need for further improvements in a drive device having a cover member.

SUMMARY

An aspect of the present disclosure provides a drive device. The drive device comprising:
- an electrical component which controls the electric motor;
- a base member which includes an arrangement surface on which the electrical component is arranged and a side surface extending annularly around a first parallel arrangement direction in which the arrangement surface and the electrical component are arranged;
- a cover member which includes a top portion having an inner ceiling surface facing the electrical component in the first parallel arrangement direction and a wall portion having an inner wall surface extending annularly around the first parallel arrangement direction in a vertically extending manner from the inner ceiling surface in the first parallel arrangement direction;
- a connecting unit which connects the base member and the cover member in a fitting manner;
- protrusions which include a first protrusion and a second protrusion disposed on the side surface, protrude in an opposite direction each other on a second parallel arrangement direction along a plane perpendicular to the first parallel arrangement direction so as to come in contact with the inner wall surface, and are less deformable than the wall portion.

According to this, misalignment between the cover member and the base member may be easily suppressed.

BRIEF DESCRIPTION OF DRAWINGS

The disclosure is further described with reference to the accompanying drawings in which.

DETAILED DESCRIPTION

Figure 1:
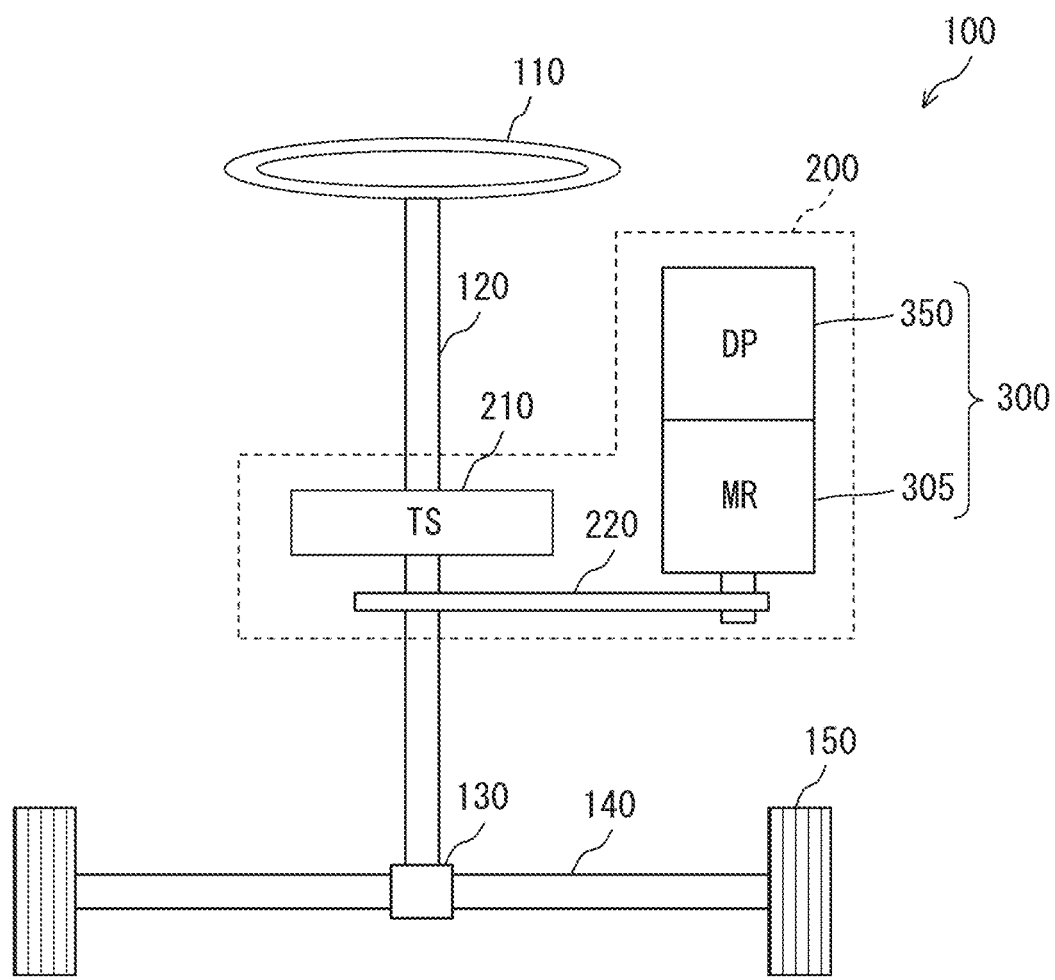
FIG. 1 is a schematic diagram showing a steering system.

The following describes embodiments for carrying out the present disclosure with reference to the drawings. In each embodiment, parts corresponding to the elements described in the preceding embodiments are denoted by the same reference numerals, and redundant explanation may be omitted. When only a part of a configuration is described in an embodiment, another preceding embodiment may be applied to the other parts of the configuration.

It may be possible not only to combine parts the combination of which is explicitly described in an embodiment, but also to combine parts of respective embodiments the combination of which is not explicitly described if any obstacle does not especially occur in combining the parts of the respective embodiments.

JP2012-152091A1 describes a drive device which includes a connector holder forming an outer shell of a control unit and an end cover which is fixed to the connector holder in a snap fit manner.

There was a risk that the end cover (a cover member) and the connector holder (a base member) may be shifted due to vibration or the like.

Accordingly, it is an object of the present disclosure to provide a drive device in which positional deviation between the cover member and the base member is suppressed.

First Embodiment

An electric power steering device 200 to which a drive device according to the present embodiment is applied is described with reference to FIGS. 1 to 22.

<Steering System>

As shown in FIG. 1, the electric power steering device 200 is used for a steering system 100 of a vehicle. The steering system 100 includes a steering wheel 110, a steering shaft 120, a pinion gear 130, a rack shaft 140, wheels 150, and the electric power steering device 200.

The steering wheel 110 is connected to the steering shaft 120. The pinion gear 130 is provided at an end of the steering shaft 120. The pinion gear 130 meshes with the rack shaft 140. A pair of wheels 150 is connected to both ends of the rack shaft 140 via tie rods or the like.

When a driver turns the steering wheel 110, the steering shaft 120 connected to the steering wheel 110 rotates. A rotational motion of the steering shaft 120 is converted into a linear motion of the rack shaft 140 by the pinion gear 130. As a result, the pair of wheels 150 are steered to an angle corresponding to the amount of displacement of the rack shaft 140.

<Electric Power Steering Device>

The electric power steering device 200 has a function to assist a rotation of the steering wheel 110. The electric power steering device 200 includes a torque sensor 210, a reduction gear 220, and an electric drive device 300 as shown in FIG. 1. The electric drive device 300 includes a motor 305 and a driving unit 350. Note that in the drawings, the torque sensor 210 is abbreviated as "TS". The motor 305 is abbreviated as "MR". The driving unit 350 is abbreviated as "DP".

The torque sensor 210 is configured to detect a steering torque of the steering shaft 120. A steering torque detected by the torque sensor 210 is input to the driving unit 350.

The driving unit 350 is configured to control an actuation of the motor 305 based on the steering torque detected by the torque sensor 210, signals input from ECUs mounted on the vehicle, and the like.

The motor 305 is connected to the reduction gear 220 through a belt (not shown). The reduction gear 220 decelerates a rotation of the motor 305 and transmits it to the steering shaft 120. Accordingly, a rotating motion (steering) of the steering wheel 110 is assisted.

The electric power steering device 200 of the present embodiment is a column assist electric power steering device that provides an assist force to the steering shaft 120 for assisting the steering. However, the configuration of the electric power steering device 200 is not limited to the above-described example. The electric power steering device 200 may be a rack assist electric power steering device that provides an assist force to the rack shaft 140 or a pinion assist electric power steering device that provides an assist force to the pinion gear 130.

<Electric Drive Device>

The electric drive device 300 is described next. Hereinafter, three directions orthogonal to each other are referred to as an x-direction, a y-direction, and a z-direction. The x-direction corresponds to a second parallel arrangement direction. The y direction corresponds to a third parallel arrangement direction. The z-direction corresponds to a first parallel arrangement direction.

Figure 2:
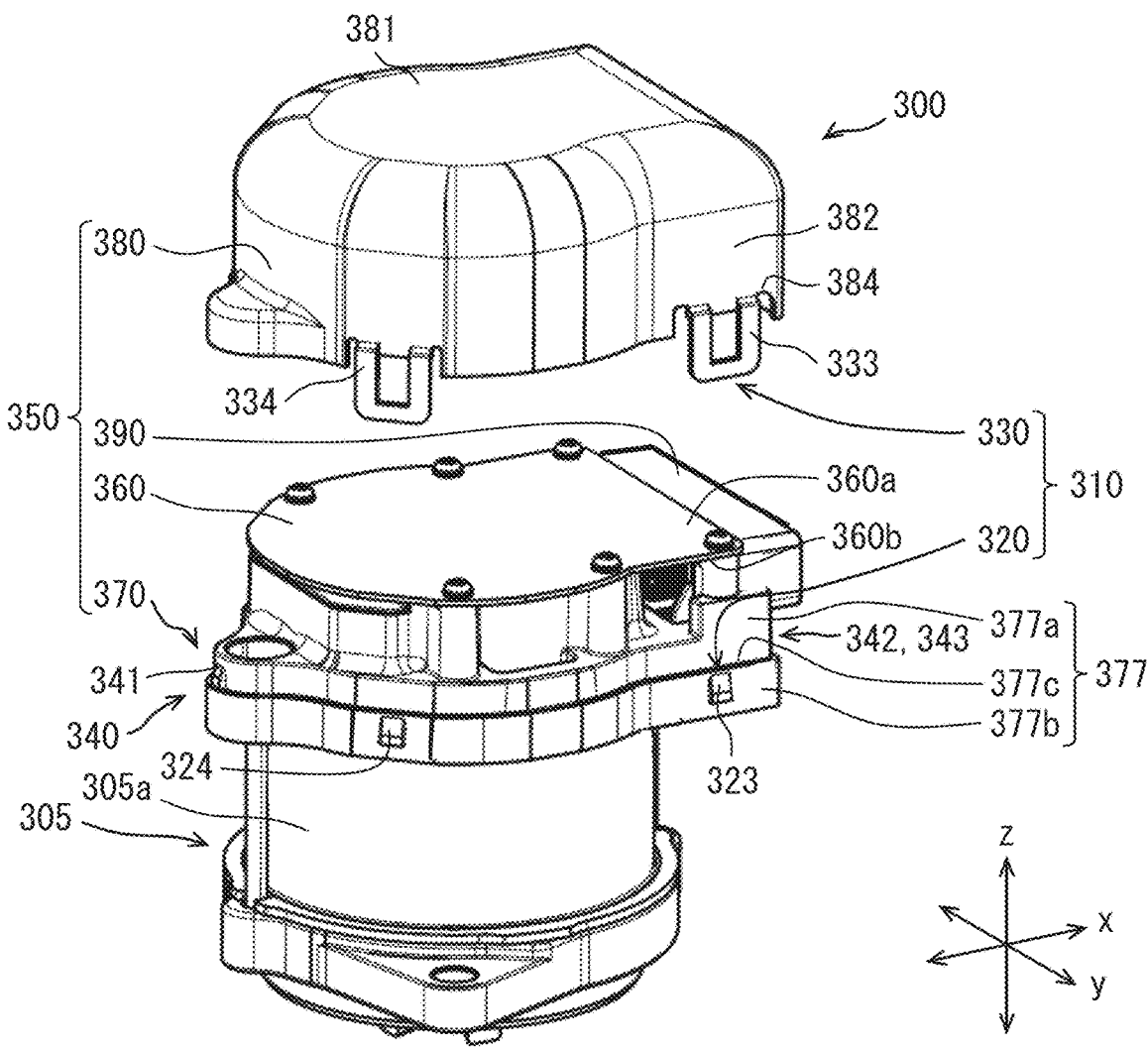
FIG. 2 is an exploded perspective view explaining an electric drive device.

The electric drive device 300 includes the motor 305 and the driving unit 350 as described above. As shown in FIG. 2, the motor 305 and the driving unit 350 are arranged in a stacking manner in the Z-direction and connected with each other. The electric drive device 300 has so called machine-electronic integrated structure. Note that the driving unit 350 corresponds to the drive device.

<Motor>

The motor 305 has a motor shaft, a rotor, a stator, and a housing 305a. The housing 305a has a circular cylindrical shape whose axial direction is the z-direction. The motor shaft, the rotor, and the stator are housed in the housing 305a. Note that the motor 305 corresponds to an electric motor.

The motor shaft extends in the z-direction. The rotor is fitted onto the motor shaft. The stator surrounds the rotor and is housed in the housing 305a. Magnetic field from the rotor and the stator generate a rotational torque on the motor shaft. As a result, the motor shaft rotates.

The stator includes three-phase stator coils: a U-phase, a V-phase, and a W-phase. A set of motor wires for supplying three-phase alternating current to these three-phase stator coils extend in the z-direction from the housing 305a toward the driving unit 350. Distal ends of the motor wire protrude from the housing 305a in the z-direction and are electrically connected to the control circuit board 360 described later.

<Drive Unit>

As shown in FIG. 2, the driving unit 350 includes at least one connecting unit 310, a control circuit board 360, a base member 370, a cover member 380, and a connector 390. The connecting unit 310 connects the base member 370 and the cover member 380 in a fitting manner. The connecting units 310 are explained in detail later. Note that the control circuit board 360 corresponds to an electrical component.

As described above, the control circuit board 360 is electrically connected to the motor 305. The control circuit board 360 has a function of controlling a driving of the motor 305. The control circuit board 360 is fixed to the base member 370 via fastening members such as bolts.

The connector 390 is also connected to the control circuit board 360. The connector 390 has a function of supplying battery power to active elements, passive elements, wiring patterns, etc., which are mounted on the control circuit board 360 described later.

The base member 370 and the cover member 380 are fixed in a fitting manner. The control circuit board 360 and the connector 390 are accommodated in a storage space defined by the base member 370 and the cover member 380. This structure protects the control circuit board 360 and the connector 390 from an outside. A portion of the connector 390 is exposed from the cover member 380.

<Control Board>

The control circuit board 360 is a component in which active elements such as MOSFET and passive elements such as capacitor are mounted on a wiring board formed in a plate shape that is thin in the z-direction. A wiring pattern of the wiring board, the active elements, and the passive elements provide a microcontroller, a gate driver, an inverter, and the like for controlling the motor 305 in the control circuit board 360.

As shown in FIG. 2, the control circuit board 360 has an upper board surface 360a and a lower board surface 360b arranged in parallel in the z-direction. The control circuit board 360 is connected to the base member 370 via fastening members such as bolts in such a manner that the board lower surface 360b faces an arrangement surface 371a described later.

<Base Member>

The base member 370 fixes the control circuit board 360 and the connector 390, and also accommodates a part of the motor shaft. The base member 370 is made of a member containing metal, for example.

Figure 3:
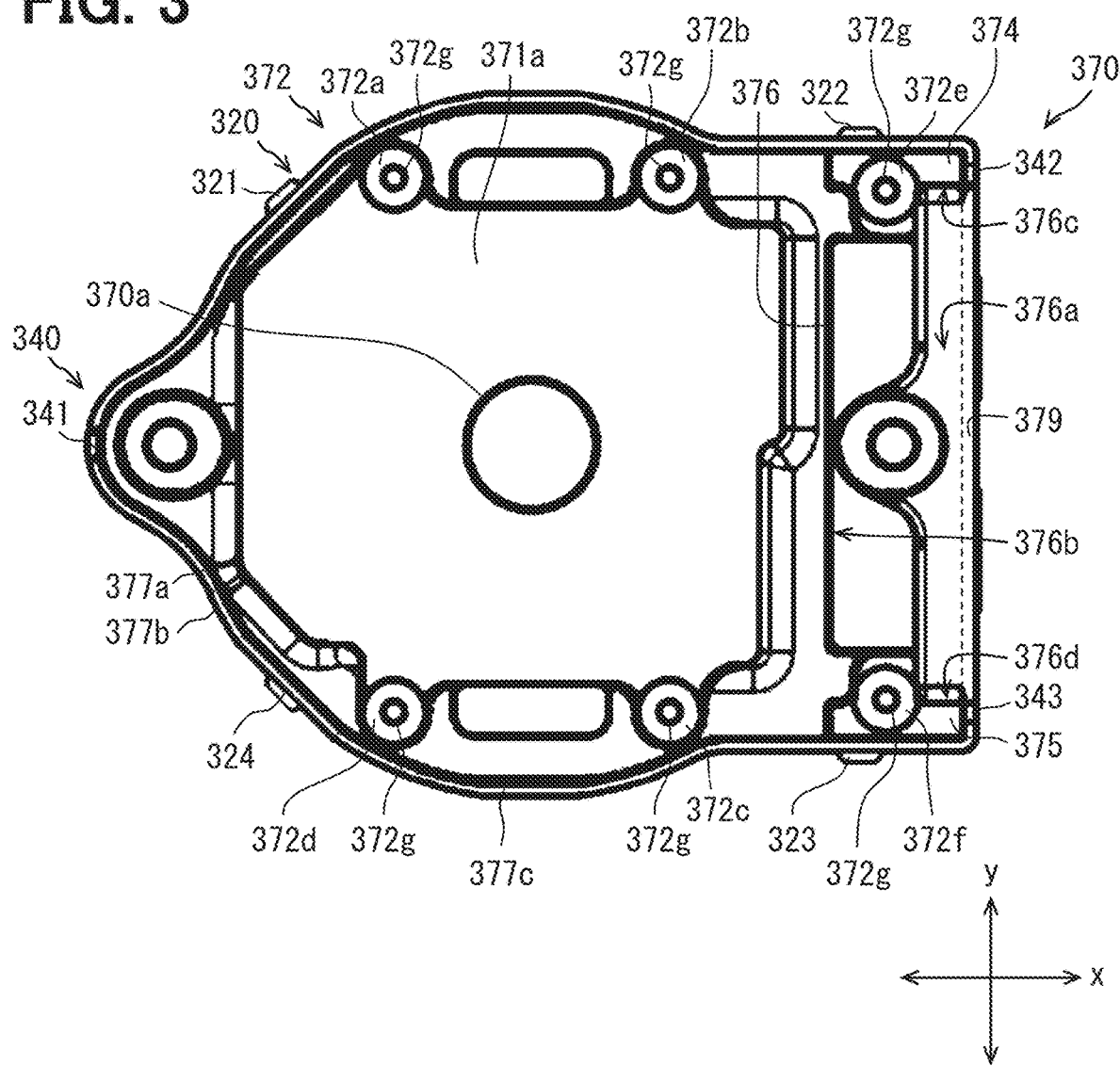
FIG. 3 is a top view explaining a base member.
Figure 4:
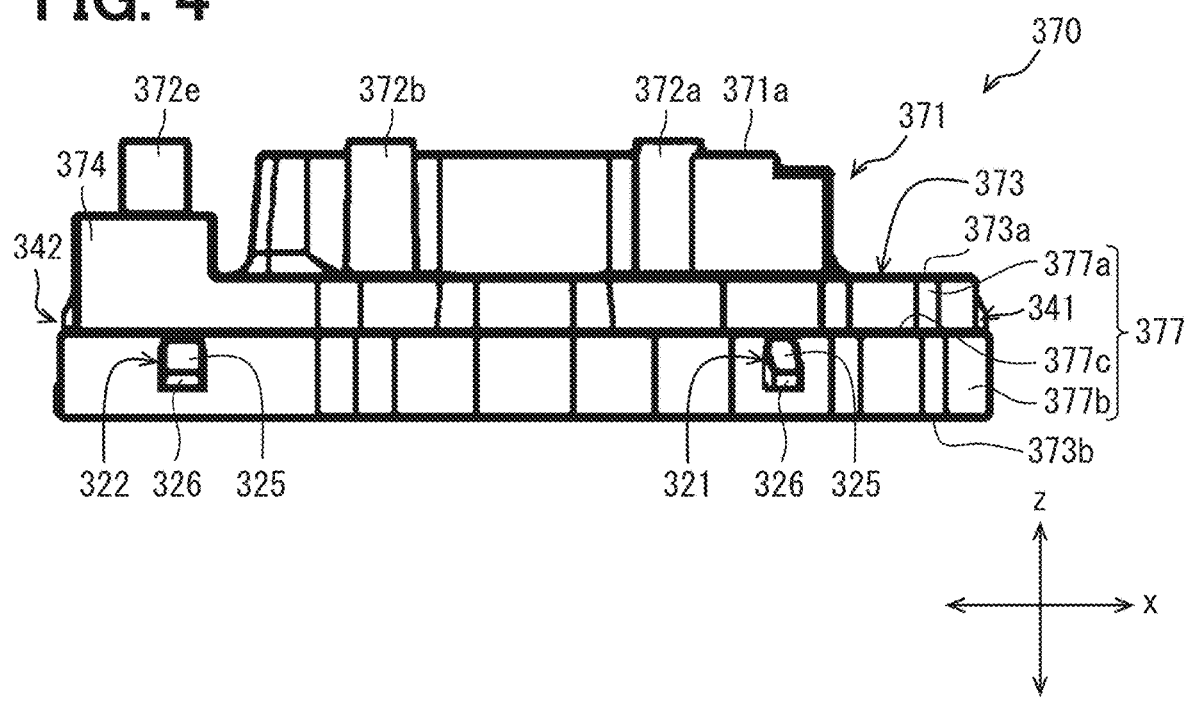
FIG. 4 is a side view explaining the base member.
Figure 5:
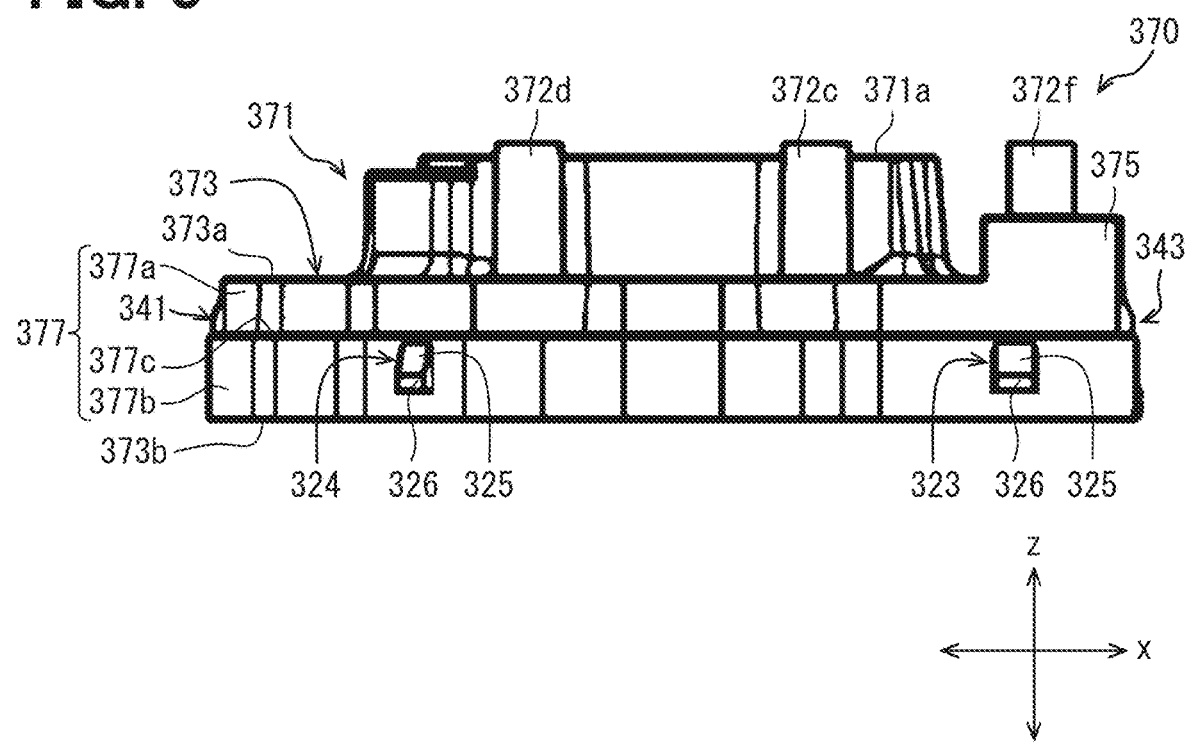
FIG. 5 is a side view explaining the base member.
Figure 6:
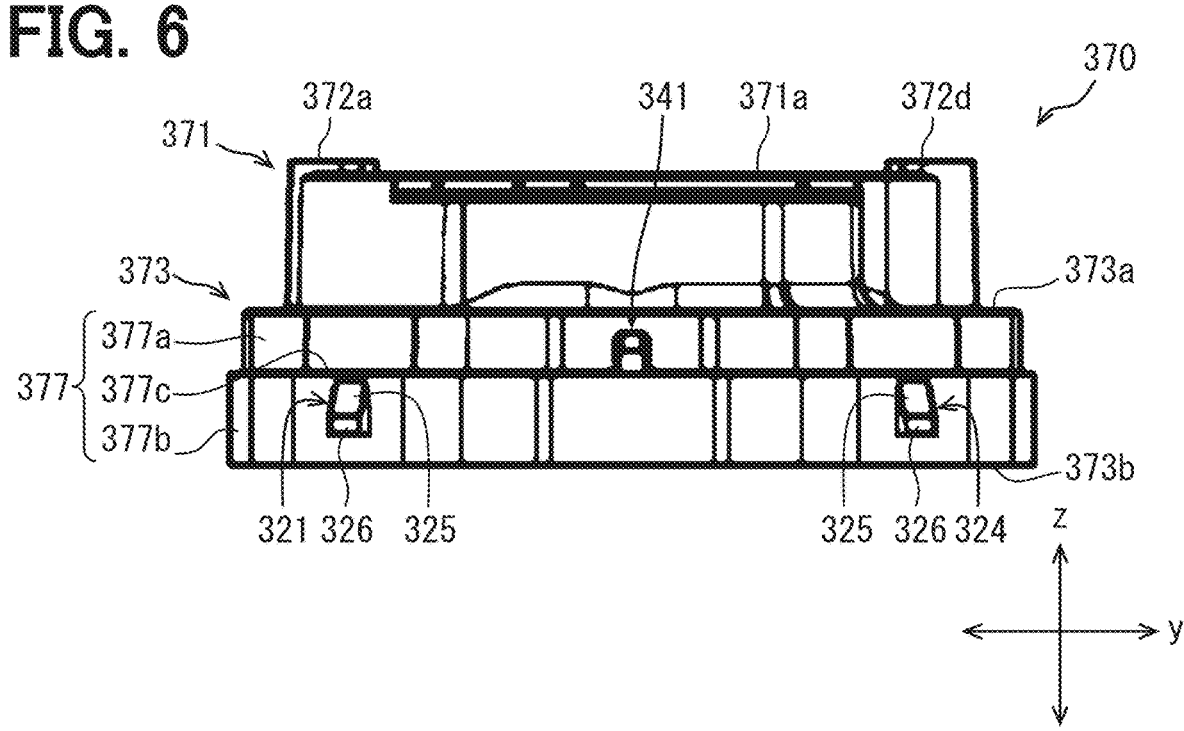
FIG. 6 is a side view explaining the base member.
Figure 7:
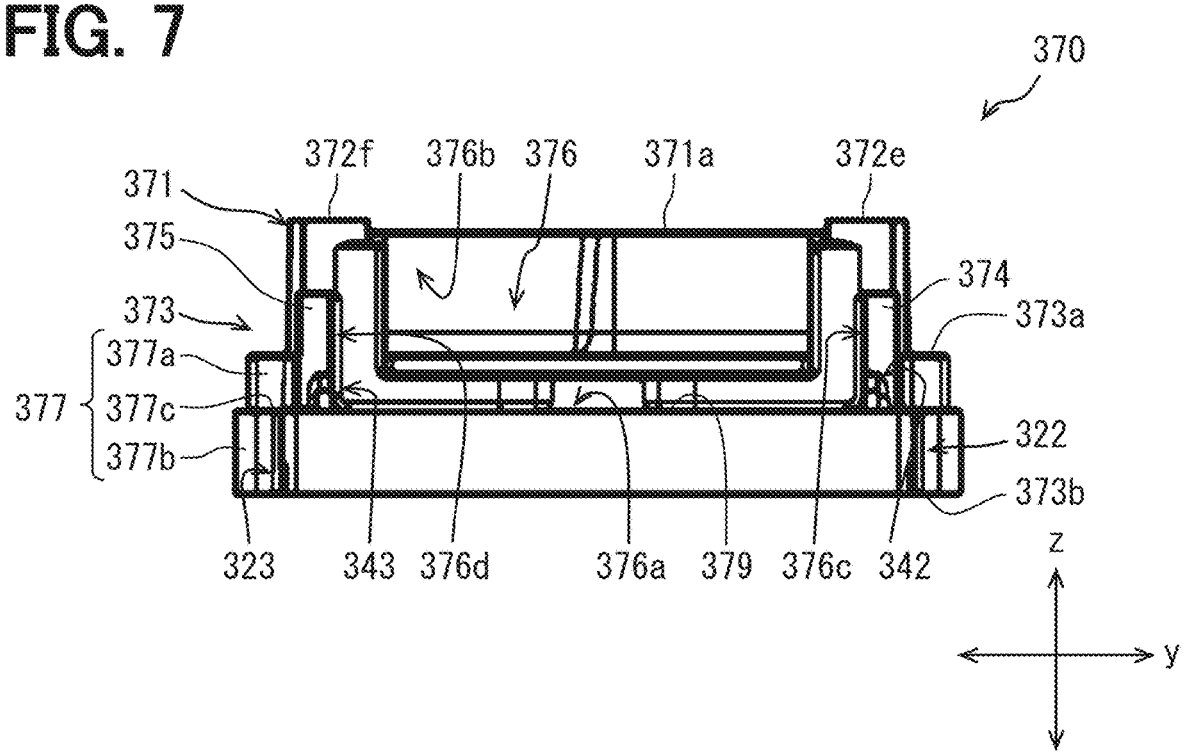
FIG. 7 is a side view explaining the base member.

FIG. 3 shows a top view of the base member 370 viewed from the arrangement surface 371a described later. FIG. 4 shows a side view of the base member 370 viewed from a side of a first anchoring portion 321 and a second anchoring portion 322 described later. FIG. 5 shows a side view of the base member 370 viewed from a side of a third anchoring portion 323 and a fourth anchoring portion 324 described later. FIG. 6 shows a side view of the base member 370 viewed from a side of the first anchoring portion 321 and the fourth anchoring portion 324. FIG. 7 shows a side view of the base member 370 viewed from a side of the second anchoring portion 322 and the third anchoring portion 323.

As shown in FIGS. 3 to 7, the base member 370 has an arrangement portion 371 and a base portion 373 on which the arrangement portion 371 is provided. The arrangement portion 371 and the base portion 373 are integrally connected in a manner that they are arranged in parallel in the z-direction.

The base portion 373 has a base member upper surface 373a and a base member lower surface 373b that are arranged to be spaced apart from each other in parallel in the z-direction, and a side surface 377 that extends in a circumferential direction about the z-direction around the base member upper surface 373a and the base member lower surface 373b.

As shown in FIGS. 4 and 5, the arrangement portion 371 is integrally connected to the base member upper surface 373a. The arrangement portion 371 extends from the base member upper surface 373a in a manner that projects in the z-direction. The arrangement portion 371 has the arrangement surface 371a on an end spaced apart in the z-direction from the base member upper surface 373a. The control circuit board 360 is arranged on the arrangement surface 371a. Note that the substrate lower surface 360b does not need to be in contact with the arrangement surface 371a.

Further, the arrangement portion 371 is provided at a center of the base member upper surface 373a in the planar direction along the x-direction and the y-direction. A shaft hole 370a penetrating in the z-direction is formed in the center of each of the base portion 373 and the arrangement portion 371 in the planar direction. A part of the motor shaft is accommodated in the shaft hole 370a.

The base member 370 also has fastening portions 372 for fastening members for fixing the control circuit board 360 in addition to the arrangement portion 371 and the base portion 373. The fastening portion 372 is integrally connected to the base member upper surface 373a.

The fastening portion 372 extends from the base member upper surface 373a in a manner that projects in the z-direction. A fastening hole 372g is formed in each one of the fastening portions 372 to fasten a component toward the base member upper surface 373a. The control circuit board 360 is fixed to the fastening portions 372 by inserting fastening members into the fastening holes 372g, respectively.

The fastening portions 372 include a first fastening portion 372a, a second fastening portion 372b, a third fastening portion 372c, a fourth fastening portion 372d, a fifth fastening portion 372e, and a sixth fastening portion 372f.

Each of the fastening portion 372. including the first fastening portion 372a to the fourth fastening portion 372d, is integrally connected to the arrangement portion 371. The first fastening portion 372a to the fourth fastening portion 372d are arranged in this order in the clockwise direction in a circumferential direction.

As shown in FIG. 3, the first fastening portion 372a and the second fastening portion 372b are arranged to be spaced apart from each other in the x-direction. The first fastening portion 372a and the third fastening portion 372c are arranged to be spaced apart from each other in both the x-direction and the y-direction. The first fastening portion 372a and the fourth fastening portion 372d are arranged to be spaced apart from each other in the y-direction.

The first fastening portion 372a and the second fastening portion 372b are integrally connected to one end side of the arrangement portion 371 in the y-direction. The third fastening portion 372c and the fourth fastening portion 372d are integrally connected to the other end of the arrangement portion 371 in the y-direction.

The above-mentioned arrangement surface 371a is provided between the first fastening portion 372a, the second fastening portion 372b, the third fastening portion 372c, and the fourth fastening portion 372d. Note that distances between distal ends of the fastening portions 372 and the base member upper surface 373a may be longer than a distance between the arrangement surface 371a and the base member upper surface 373a.

Note that distances between distal ends of the fastening portions 372 and the base member upper surface 373a may be equal to a distance between the arrangement surface 371a and the base member upper surface 373a.

Further, as shown in FIG. 4, a first protruding portion 374 protruding from the base member upper surface 373a in the z-direction is formed on the base portion 373 at a corner portion on a side to the second fastening portion 372b and the third fastening portion 372c and on a side to the first fastening portion 372a and the second fastening portion 372b.

Similarly, as shown in FIG. 5, a second protruding portion 375 protruding from the base member upper surface 373a in the z-direction is formed on the base portion 373 at a corner portion on a side to the second fastening portion 372b and the third fastening portion 372c and on a side to the third fastening portion 372c and the fourth fastening portion 372d.

Further, a fifth fastening portion 372e protruding in the z-direction from the base member upper surface 373a is formed at the first protruding portion 374.

Further, a sixth fastening portion 372f protruding in the z-direction from the base member upper surface 373a is formed at the second protruding portion 375.

A fastening hole 372g is also formed in each of the fifth fastening portion 372e and the sixth fastening portion 372f from distal ends toward the base member upper surface 373a.

For this purpose, the control circuit board 360 is fixed to the first fastening portion 372a to the sixth fastening portion 372f, including the first fastening portion 372a, the second fastening portion 372b, the third fastening portion 372c, the fourth fastening portion 372d, the fifth fastening portion 372e, and the sixth fastening portion 372f, via fastening members such as bolts.

Further, as shown in FIGS. 3 and 7, a concave portion 376 is formed at a portion of the base portion 373 between the first protruding portion 374 and the second protruding portion 375 in a concaved manner from the base member upper surface 373a toward the base member lower surface 373b.

The concave portion 376 is formed continuously from an end in the x-direction on a side to the arrangement portion 371 to an end spaced apart from the arrangement portion 371 in the x-direction. If the concave portion 376 is viewed from an end spaced apart from the arrangement portion 371 in the x-direction, a second defining surface 376b described later is placed visible.

As shown in FIG. 7, the concave portion 376 is defined by a first defining surface 376a facing the z-direction, a second defining surface 376b facing the x-direction, a third defining surface 376c and a fourth defining surface 376d facing the y-direction and facing each other.

The third defining surface 376c is located on a side to the first fastening portion 372a and the second fastening portion 372b than the fourth defining surface 376d. The fourth defining surface 376d is located on a side to the third fastening portion 372c and the fourth fastening portion 372d than the third defining surface 376c.

The connector 390 is inserted into a space defined by the first defining surface 376a, the board lower surface 360b of the control circuit board 360, the third defining surface 376c, and the fourth defining surface 376d. The connector 390 is fixed to each of the control circuit board 360 and the base member 370 via a fastening member or the like.

Next, the side surface 377 is explained. As shown in FIGS. 2 to 10, the side surface 377 has a first side surface 377a and a second side surface 377b arranged in parallel n the z-direction, and a third side surface 377c that connects the first side surface 377a and the second side surface 377b. The first side surface 377a is provided on a side to the control circuit board 360 in the z-direction than the second side surface 377b.

The first side surface 377a extends along a periphery of the base member upper surface 373a in a manner that a counterclockwise direction from an end of the third defining surface 376c on a side away from the arrangement portion 371 in the x-direction to an end of the fourth defining surface 376d on a side away from the arrangement portion 371 in the x-direction.

The first side surface 377a and the second side surface 377b are formed on the base member 370 in a stacking manner in the z-direction. Both the first side surface 377a and the second side surface 377b extend along a circumferential direction of a periphery about the z-direction. Both the first side surface 377a and the second side surface 377b extend to surround an outer periphery of the base member upper surface 373a. Furthermore, the second side surface 377b extends in a circumferential direction about the z-direction so as to surround the control circuit board 360 in an annular manner. In other words, on an x-y plane, the second side surface 377b defines an area wider than the control circuit board 360 to accommodate the control circuit board 360.

As shown in FIGS. 2 to 10, the second side surface 377b is located on a side further away from the control circuit board 360 in the planar direction than the first side surface 377a. A part of the first side surface 377a and the second side surface 377b are connected by the third side surface 377c.

Further, as shown in FIG. 3, the third side surface 377c is connected to a part of the first defining surface 376a in a circumferential direction about the z-direction.

Hereinafter, to simplify the explanation, a portion of the first defining surface 376a connected to the third side surface 377c in a circumferential direction about the z-direction is referred to as a connection surface 379.

In addition, in FIG. 3, a broken line is added to show a boundary line between the connection surface 379 and a portion of the first defining surface 376a excluding the connection surface 379.

A surface consisting of the third side surface 377c and the connection surface 379 extends annularly around the control circuit board 360 in a circumferential direction.

As shown in FIGS. 2 to 10, the base member 370 includes the plurality of anchoring portions 320 and the plurality of protrusions 340 in addition to the components described above. Note that the engaging portion 320 corresponds to a base member side fitting portion. The protrusions 340 corresponds to a protrusion.

<Anchoring Portion>

The plurality of anchoring portions 320 include a first anchoring portion 321, a second anchoring portion 322, a third anchoring portion 323, and a fourth anchoring portion 324. Note that the first anchoring portion 321 and the second anchoring portion 322 correspond to a first fitting portion. The third anchoring portion 323 and the fourth anchoring portion 324 correspond to a second fitting portion.

As shown in FIGS. 3 to 7, each one of the anchoring portions 321-324, including the first anchoring portion 321, the second anchoring portion 322, the third anchoring portion 323, and the fourth anchoring portion 324, is connected to the second side surface 377b. Each of the first anchoring portion 321 to the fourth anchoring portion 324 protrudes from the second side surface 377b.

Each one of the first anchoring portion 321 to the fourth anchoring portion 324 has an anchoring upper portion 325 and an anchoring lower portion 326 which is connected to the anchoring upper portion 325 on a side to the base lower surface 373b and extends toward the base lower surface 373b. A radial height, i.e., a radial distance, of the anchoring upper part 325 from the second side surface 377b increases as a distance from a side of the base member upper surface 373a to a side of the base member lower surface 373b increases.

In a process of assembling the cover member 380 and the base member 370 in a snap-fit manner, as the cover member 380 approaches the base member 370, a distal end of the hooking portion 330 comes in contact with and slides on the anchoring upper portion 325, then the anchoring lower portion 326 is inserted into the fixing hole 336 of the hooking member 330. As a result, the cover member 380 and the base member 370 are fixed.

As shown in FIGS. 3 to 7, the first anchoring portion 321 to the fourth anchoring portion 324 are provided on the second side surface 377b in a clockwise direction in this order. The first anchoring portion 321 and the second anchoring portion 322 are provided on a portion of the second side surface 377b on a side where the first fastening portion 372a and the second fastening portion 372b are provided. The third anchoring portion 323 and the fourth anchoring portion 324 are provided on a portion of the second side surface 377b on a side where the third fastening portion 372c and fourth fastening portion 372d are provided.

The first anchoring portion 321 and the second anchoring portion 322 are separated from each other in the x-direction. The third anchoring portion 323 and the fourth anchoring portion 324 are separated from each other in the x-direction.

Note that at least one of the anchoring portions 321-324, including the first anchoring portion 321 to the fourth anchoring portion 324, may not be integrally connected to the second side surface 377b. The first anchoring portion 321 to the fourth anchoring portion 324 may be separate from the second side surface 377b and may be connected to each other via a connecting member (not shown) or the like.

<Protrusion>

As shown in FIGS. 2 to 10, the plurality of protrusions 340 include a first protrusion 341, a second protrusion 342, and a third protrusion 343. Each of the first protrusion 341, the second protrusion 342 and the third protrusion 343 is connected to the first side surface 377a. The first protrusion 341 corresponds to a first protrusion. The second protrusion 342 and the third protrusion 343 correspond to the second protrusion.

Each of the first protrusion 341, the second protrusion 342 and the third protrusion 343 protrudes away from the first side surface 377a. Each of the first protrusion 341, the second protrusion 342, and the third protrusion 343 has a protrusion upper portion 344 and a protrusion lower portion 345 connected to the protrusion upper portion 344 on a side to the base member lower surface 373b and extends toward the base member lower surface 373b. In other words, the protrusions 340 are placed to partially fill a corner between the first side surface 377a and the third side surface 377c. The protrusion upper portion 344 is formed to provide a slanted outer surface which defines an increasing distance with respect to the first side surface 377a as the slanted outer surface progresses from a side to the base member upper surface 373a toward a side to the base member lower surface 373b.

Figure 17:
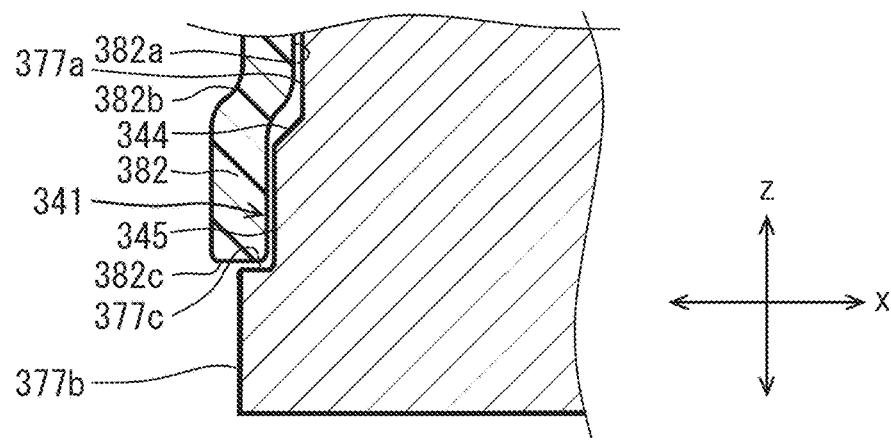
FIG. 17 is a cross-sectional view along a line XVII-XVII in FIG. 16.
Figure 18:
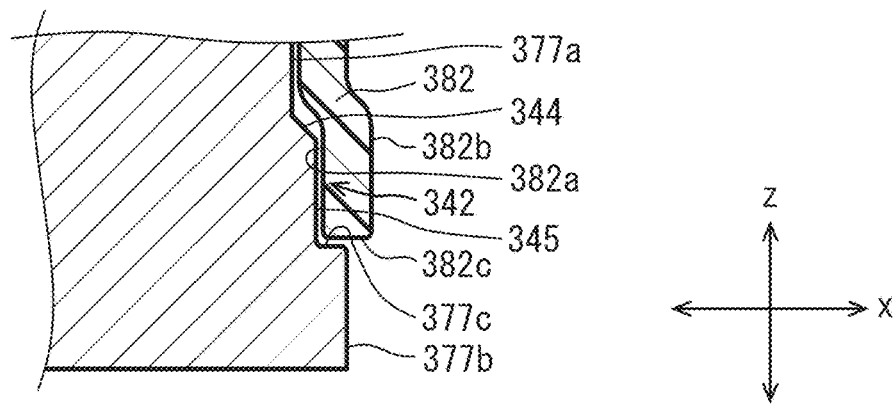
FIG. 18 is a cross-sectional view along a line XVIII-XVIII in FIG. 16.
Figure 19:
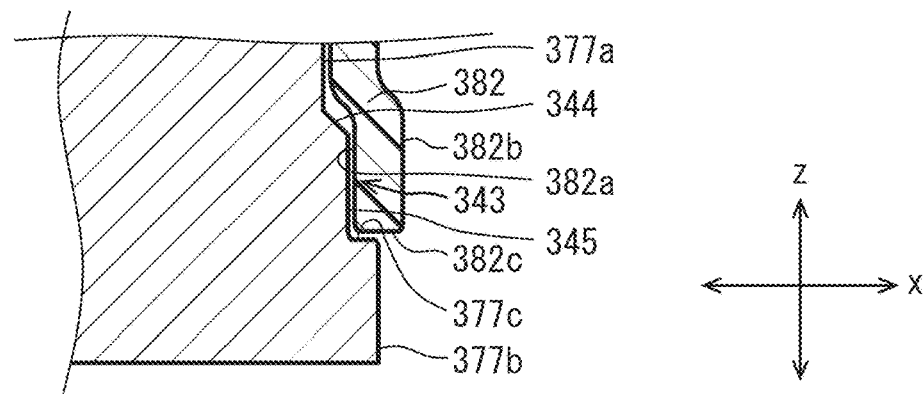
FIG. 19 is a cross-sectional view along a line XIX-XIX in FIG. 16.
Figure 20:
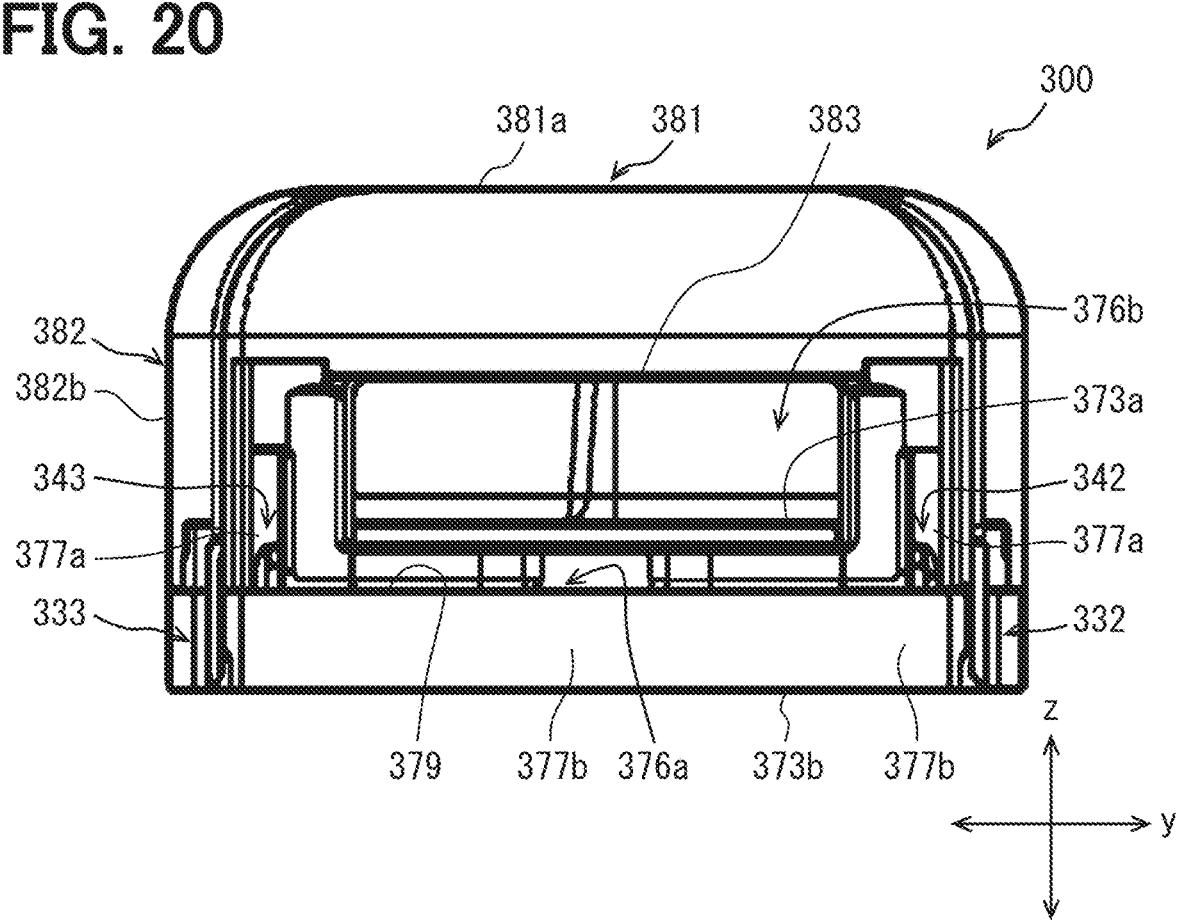
FIG. 20 is a side view explaining the joining configuration of the cover member and the base member.

As shown in FIGS. 17 to 19, a distal end of the wall portion 382 described later moves in a sliding manner on the protrusion upper portion 344, then the protrusion lower portion 345 is lightly press-fitted into the cover member 380, then a relative location of the cover member 380 and the base member 370 are finally fixed. Specifically, the protrusion lower portion 345 comes in contact with the inner wall surface 382a of the wall portion 382, thereby the relative location of the cover member 380 and the base member 370 are finally fixed.

As shown in FIGS. 3 to 7, the protrusions 340, including the first protrusion 341, the second protrusion 342 and the third protrusion 343, are provided on the first side surface 377a in this order in the clockwise direction.

The first protrusion 341 is provided on one end of the first side surface 377a in the x-direction on a side to the first fastening portion 372a and the fourth fastening portion 372d.

The protrusion lower portion 345 of the first protrusion 341 is connected to the third side surface 377c. An end of the protrusion upper portion 344 of the first protrusion 341 spaced apart from the protrusion lower portion 345 is located on a side to the third side surface 377c than the base member upper surface 373a. In other words, an upper distal end of the first protrusion 341 is located on a position between the third side surface 377c and the base member upper surface 373a. An end of the first protrusion 341 spaced apart in the z-direction from the third side surface 377c is located on a side to the third side surface 377c than the base member upper surface 373a.

Figure 8:
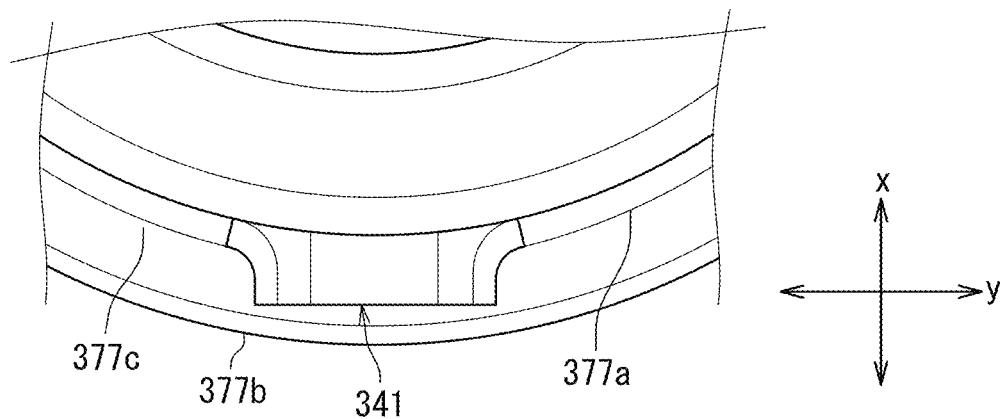
FIG. 8 is a top view explaining a first protrusion.

As shown in FIG. 8, both ends of the first protrusion 341 in the y-direction are curved. Each curved portions of the first protrusion 341 is connected to the first side surface 377a.

The second protrusion 342 is provided on the other end of the first side surface 377a in the x-direction on a side where the second fastening portion 372b and the third fastening portion 372c are provided, and on a side where the third defining surface 376c is provided. Further, the second protrusion 342 is provided on an end of the first side surface 377a in the y-direction on a side where the third defining surface 376c is provided.

Further, the protrusion lower portion 345 of the second protrusion 342 is connected to the third side surface 377c and the connection surface 379. An end of the protrusion upper portion 344 of the second protrusion 342 spaced apart from the protrusion lower portion 345 is located on a side to the third side surface 377c than the base member upper surface 373a. In other words, an upper distal end of the second protrusion 342 is located on a position between the third side surface 377c and the base member upper surface 373a. An end of the second protrusion 342 spaced apart in the z-direction from the third side surface 377c is located on a side to the third side surface 377c than the base member upper surface 373a.

Figure 9:
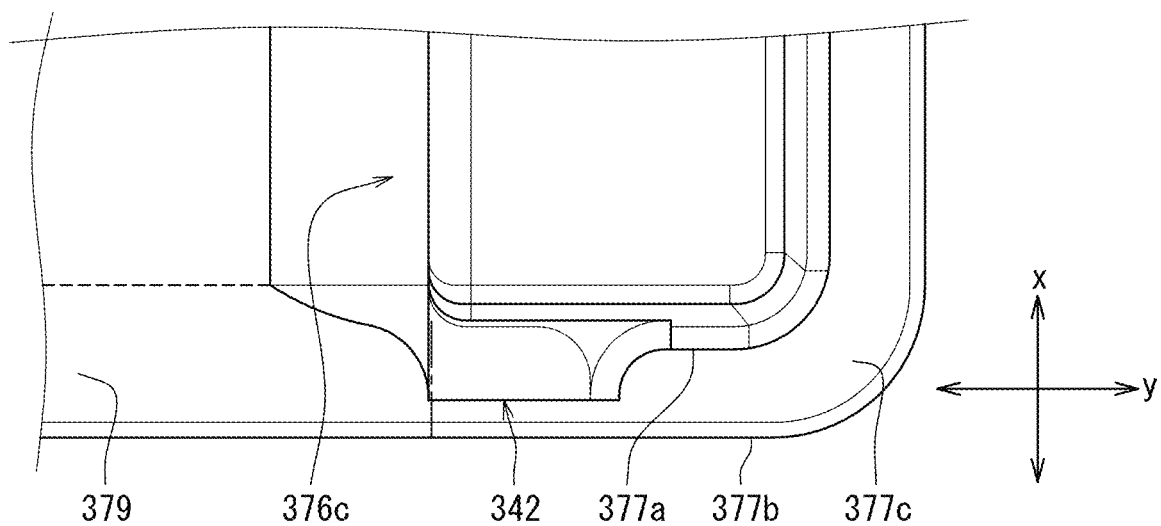
FIG. 9 is a top view explaining a second protrusion.

As shown in FIG. 9, both ends of the second protrusion 342 in the y-direction are curved, respectively. One of the curved parts of the second protrusion 342 is connected to the first side surface 377a. The other curved portion of the second protrusion 342 protrudes from the first side surface 377a to a side to the second defining surface 376b and is connected to the connection surface 379. In addition, in FIG. 9, a boundary line between the third side surface 377c and the connection surface 379 is indicated by a dashed line.

The third protrusion 343 is provided on the other end of the first side surface 377a in the x-direction on a side where the third fastening portion 372c and the fourth fastening portion 372d are provided, and on a side where the fourth defining surface 376d is provided. Further, the third protrusion 343 is provided on an end of the first side surface 377a in the y-direction on a side where the fourth defining surface 376d is provided.

The protrusion lower portion 345 of the third protrusion 343 is connected to the third side surface 377c and the connection surface 379. An end of the protrusion upper portion 344 of the third protrusion 343 spaced apart from the protrusion lower portion 345 is located on a side to the third side surface 377c than the base member upper surface 373a. In other words, an upper distal end of the third protrusion 343 is located on a position between the third side surface 377c and the base member upper surface 373a. An end of the third protrusion 343 spaced apart in the z-direction from the third side surface 377c is located on a side to the third side surface 377c than the base member upper surface 373a.

Figure 10:
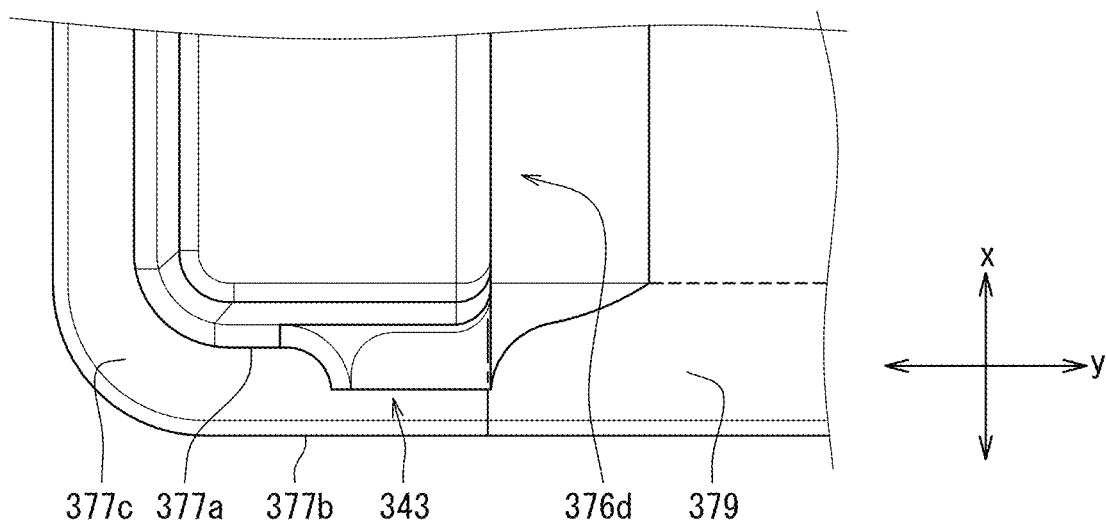
FIG. 10 is a top view explaining a third protrusion.

As shown in FIG. 10, both ends of the third protrusion 343 in the y-direction are curved, respectively. One of the curved parts of the third protrusion 343 is connected to the first side surface 377a. The other curved portion of the third protrusion 343 protrudes from the first side surface 377a to a side to the second defining surface 376b and is connected to the connection surface 379. In addition, in FIG. 10, a boundary line between the third side surface 377c and the connection surface 379 is indicated by a dashed line.

Note that at least one of the protrusions 340 may not be integrally connected to the first side surface 377a. The protrusions 340 may be separate from the first side surface 377a and may be connected via a connecting member (not shown) or the like.

<Cover Member>

The cover member 380 protects the control circuit board 360, the motor shaft, and the connector 390. The cover member 380 is made of a material containing, for example, resin.

Figure 11:
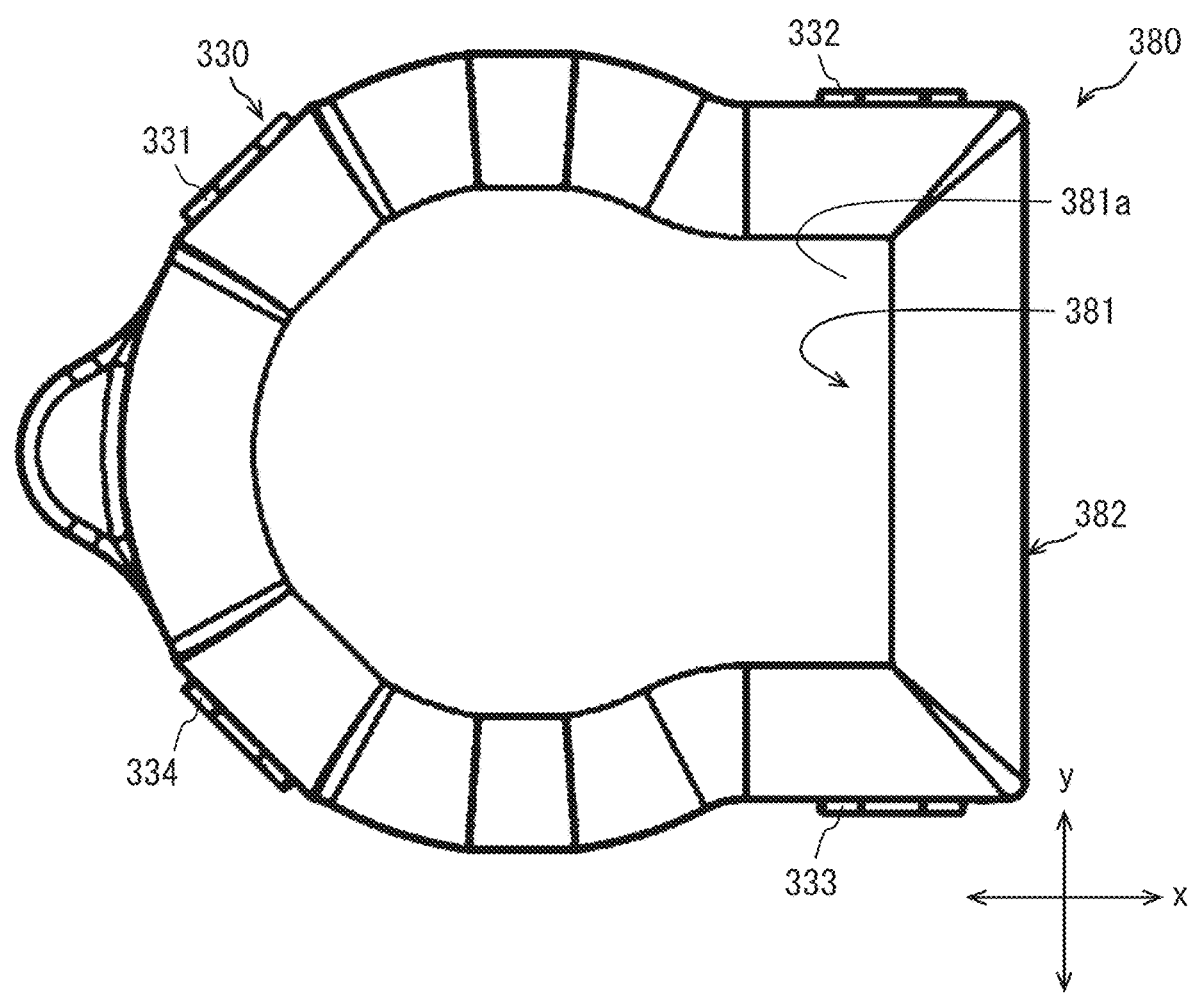
FIG. 11 is a top view explaining a cover member.
Figure 12:
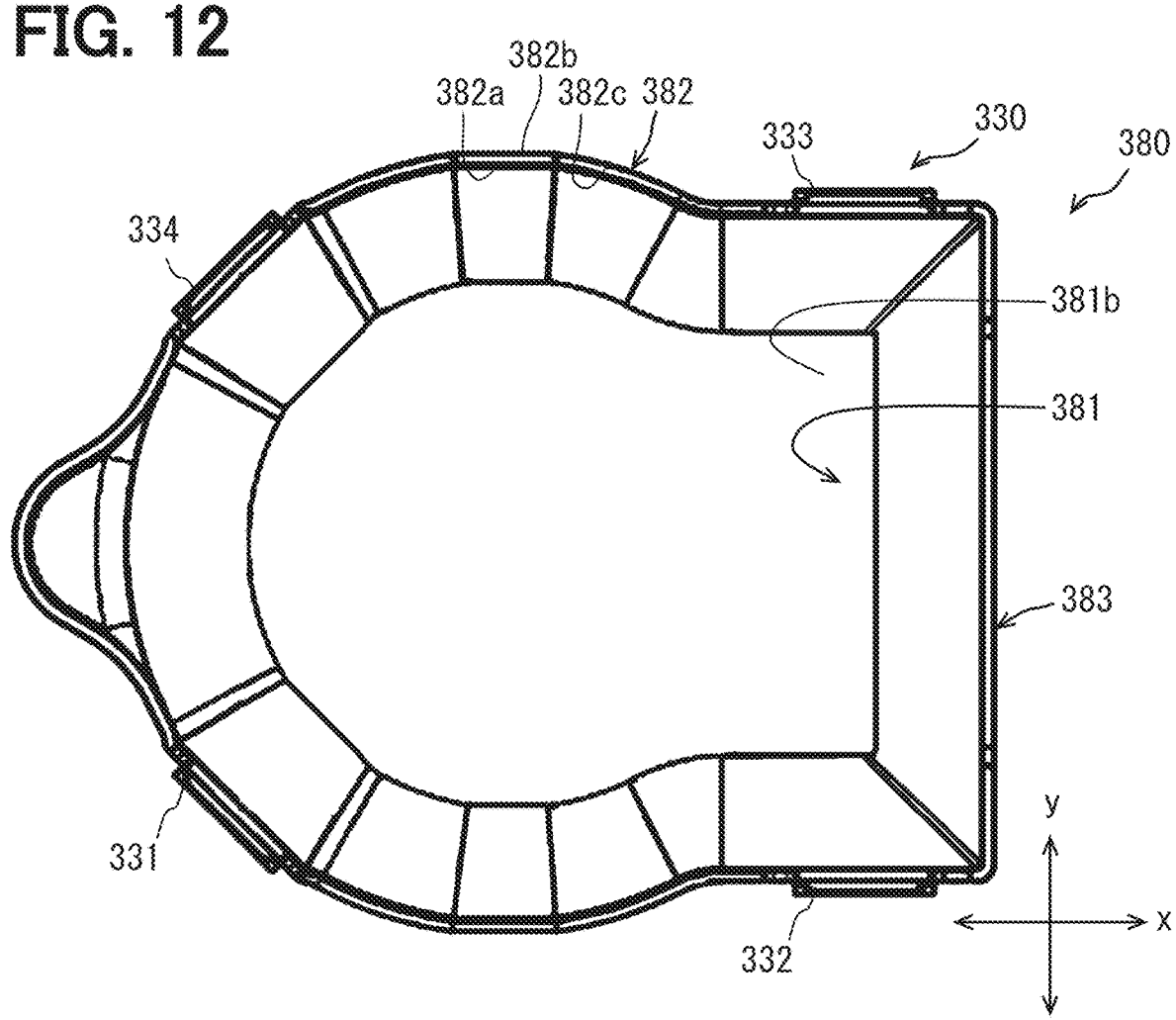
FIG. 12 is a top view explaining the cover member.
Figure 13:
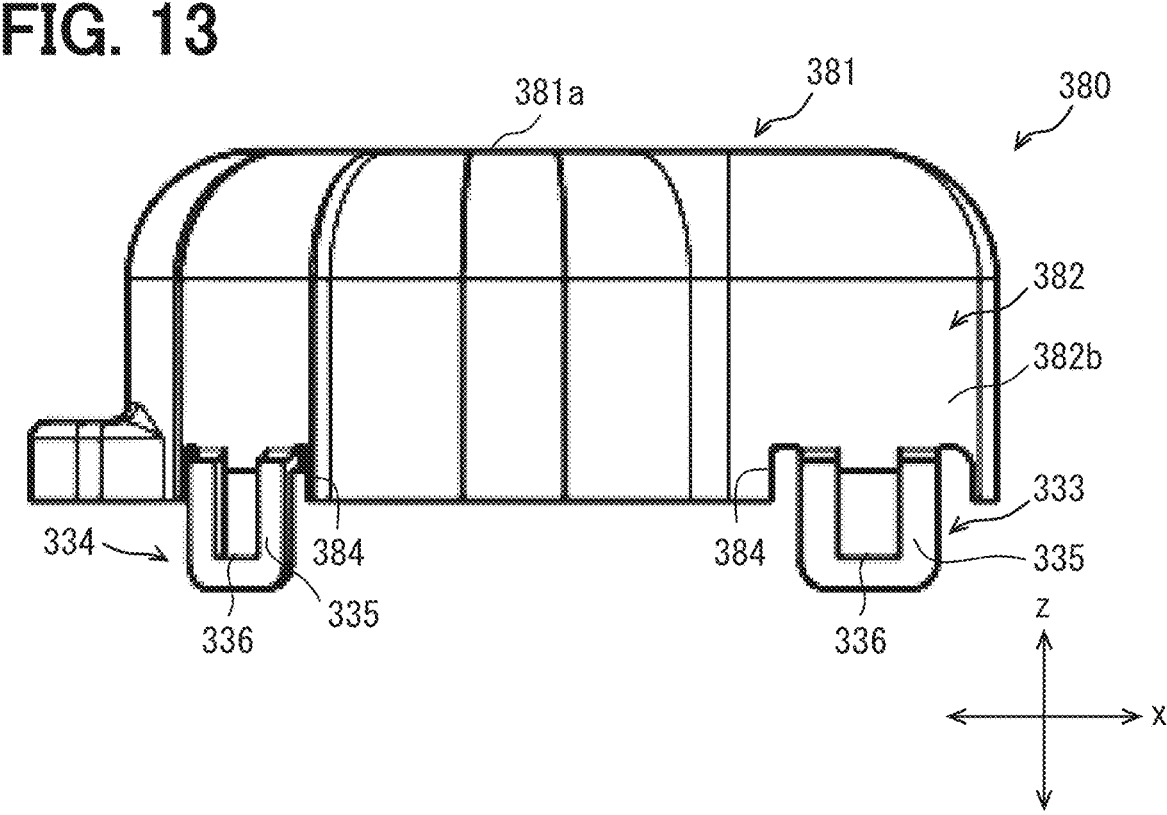
FIG. 13 is a side view explaining the cover member.
Figure 14:
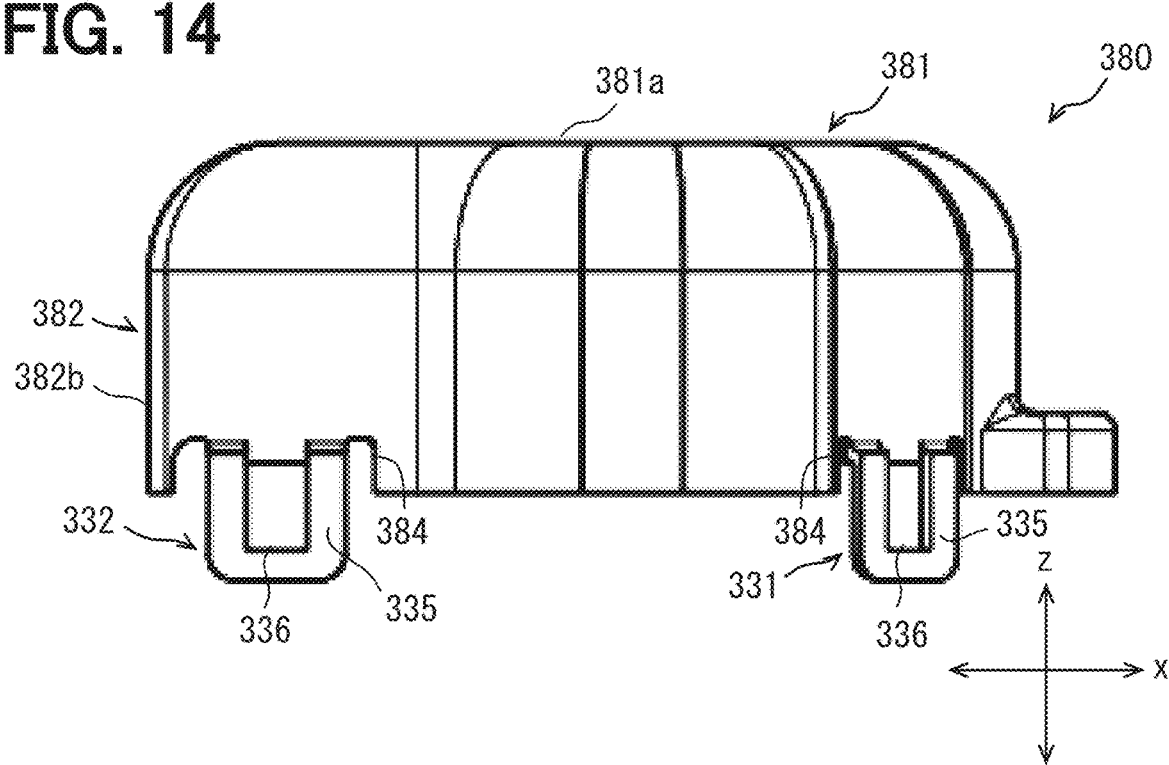
FIG. 14 is a side view explaining the cover member.
Figure 15:
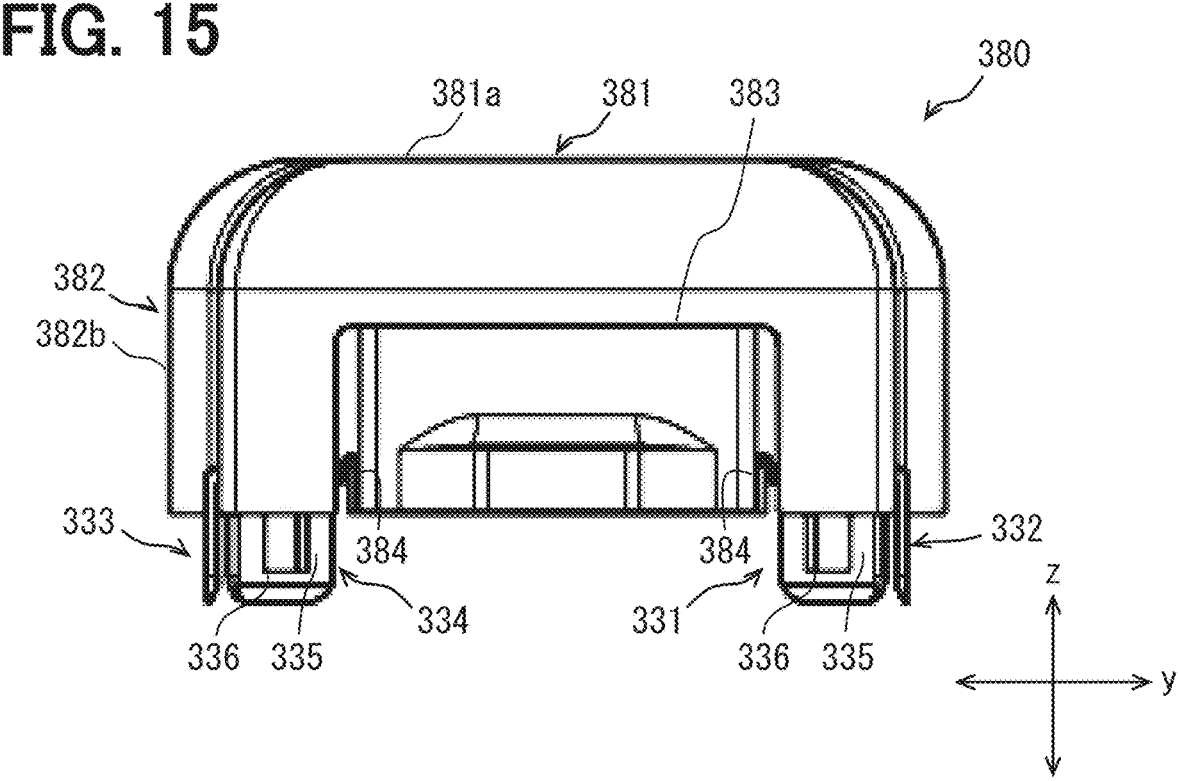
FIG. 15 is a side view explaining the cover member.

FIG. 11 shows a top view of the cover member 380 viewed from a side of the outer ceiling surface 381a described later. FIG. 12 shows a top view of the cover member 380 viewed from a side of the inner ceiling surface 381b described later. FIG. 13 shows a side view of the cover member 380 viewed from a third hooking portion 333 and a fourth hooking portion 334 described later. FIG. 14 shows a side view of the cover member 380 viewed from the first hooking portion 331 and the second hooking portion 332. FIG. 15 shows a side view of the cover member 380 viewed from the second hooking portion 332 and the third hooking portion 333.

As shown in FIGS. 11 to 15, the cover member 380 has a ceiling portion 381, a wall portion 382, and a plurality of hooking portions 330. The wall portion 382 is annularly connected to the ceiling portion 381 in the circumferential direction. The plurality of hooking portions 330 are provided at an open end of the wall portion 382 on a side to a connection wall surface 382c described later. Note that the hooking portion 330 corresponds to a cover side fitting portion.

The top portion 381 has an outer ceiling surface 381a and an inner ceiling surface 381b arranged in parallel in the z-direction. The inner ceiling surface 381b faces the substrate top surface 360a of the control circuit board 360 described above in the z-direction. The wall portion 382 is annularly connected to a circumferential edge of the inner ceiling surface 381b. The wall portion 382 extends in a vertically extending manner from the inner ceiling surface 381b in the z-direction and extends annularly around an outer edge of the wall portion 382.

The wall portion 382 has an inner wall surface 382a and an outer wall surface 382b arranged in parallel in the planar direction, and a connection wall surface 382c which connects the inner wall surface 382a and the outer wall surface 382b on a side spaced apart from the inner ceiling surface 381b in the z-direction.

As shown in FIG. 15, a through hole 383 penetrating through the inner wall surface 382a and the outer wall surface 382b is formed in a portion of the wall portion 382 on a side to the second fastening portion 372b and the third fastening portion 372c. The connector 390 is located to pass through the through hole 383, and a part of the connector 390 is exposed from the through hole 383.

As shown in FIGS. 11 to 15, the plurality of hooking portions 330 include a first hooking portion 331, a second hooking portion 332, a third hooking portion 333, and a fourth hooking portion 334. The first hooking portion 331 and the second hooking portion 332 correspond to a third fitting portion. The third hooking portion 333 and the fourth hooking portion 334 correspond to a fourth fitting portion.

Each of the first hooking portion 331 to the fourth hooking portion 334 is provided at the end on a side to the connection wall surface 382c of the wall portion 382. The first hooking portion 331 to the fourth hooking portion 334 are provided on the wall portion 382 in this order in the clockwise direction.

Each of the first hooking portion 331 to the fourth hooking portion 334, including the first hooking portion 331, the second hooking portion 334, the third hooking portion 333, and the fourth hooking portion 334, have an extension portion 335 which extends from an end on a side to the connection wall surface 382c of the wall portion 382 in a protruding manner and a fixing hole 336 penetrating through a surface on a side of the inner wall surface 382a and a surface on a side of the outer wall surface 382b and allowing the anchoring lower portion 326 to pass therethrough. The first hooking portion 331 is provided on a position on the wall portion 382 corresponding to the first anchoring portion 321. The second hooking portion 332 is provided on a position on the wall portion 382 corresponding to the second anchoring portion 322. The third hooking portion 333 is provided on a position on the wall portion 382 corresponding to the third anchoring portion 323. The fourth hooking portion 334 is provided on a position on the wall portion 382 corresponding to the fourth anchoring portion 324.

Figure 16:
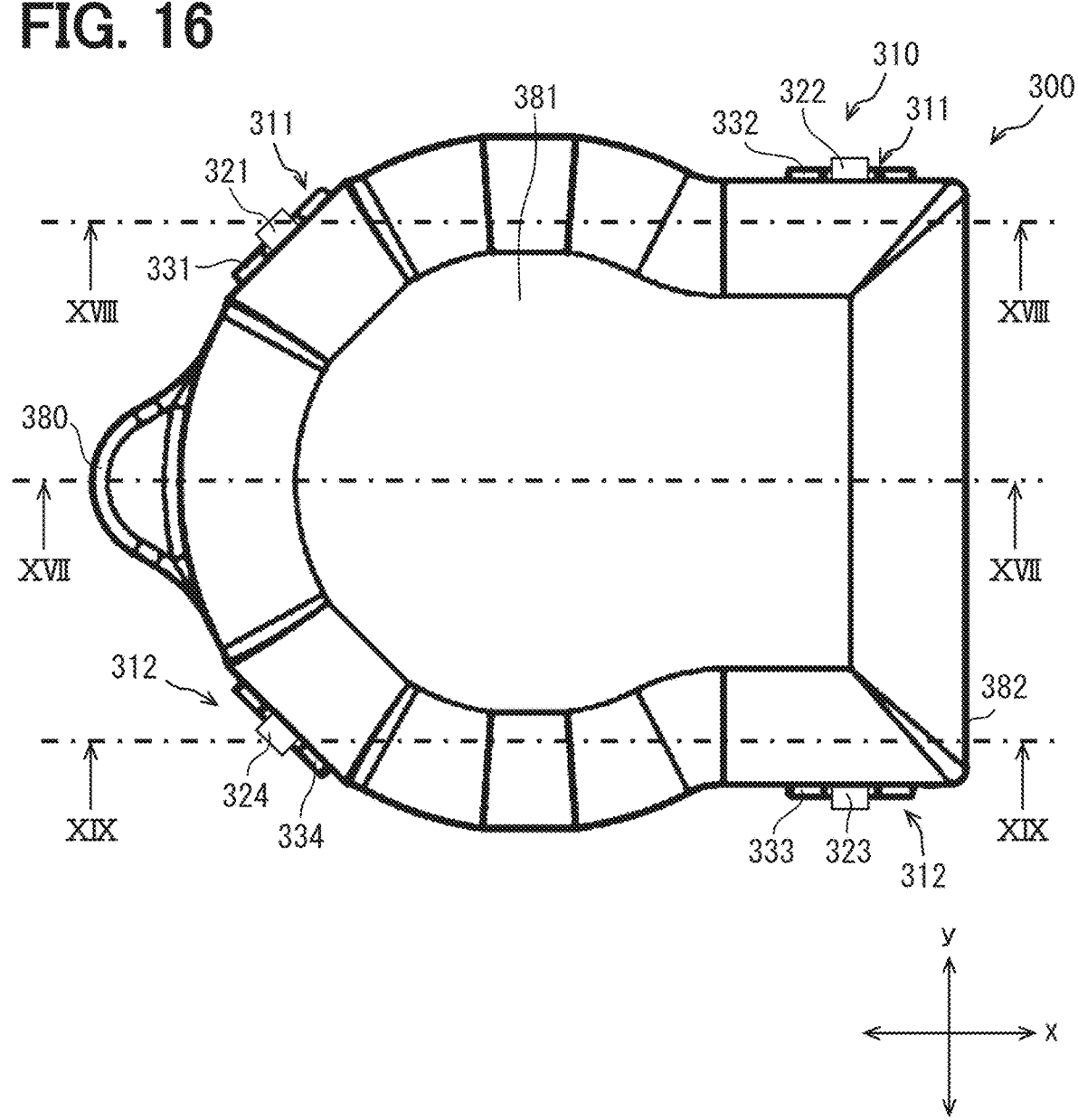
FIG. 16 is a top view explaining a joining configuration of the cover member and the base member.

As shown in FIG. 16, the anchoring lower portion 326 of the first anchoring portion 321 is placed to passed through the fixing hole 336 of the first hooking portion 331. The anchoring lower portion 326 of the second anchoring portion 322 is placed to passed through the fixing hole 336 of the second hooking portion 332. The anchoring lower portion 326 of the third anchoring portion 323 is placed to passed through the fixing hole 336 of the third hooking portion 333. The anchoring lower portion 326 of the fourth anchoring portion 324 is placed to passed through the fixing hole 336 of the fourth hooking portion 334.

In this way, the cover member 380 and the base member 370 are fixed in a snap fit manner. Note that a combination of the anchoring portion 320 and the hooking portion 330 is referred to as the connecting unit 310. The connecting units 310 are provided on a one side end in the y-direction on a side where the first fastening portion 372a and the second fastening portion 372b are provided, and on the other side end in the y-direction on a side where the third fastening portion 372c and fourth fastening portion 372d are provided.

Hereinafter, in order to simplify the explanation, the connecting units 310 disposed on a one side end in the y-direction on the side where the first fastening portion 372a and the second fastening portion 372b are provided are collectively referred to as a first connecting unit 311. The connecting units 310 disposed on the other side end in the y-direction on the side where the third fastening portion 372c and fourth fastening portion 372d are provided are collectively referred to as a second connecting unit 312. The first connecting unit 311 and the second connecting unit 312 are arranged to be spaced apart from each other in parallel in the y-direction.

Note that at least one of the hooking portions 330, including the first hooking portion 331, the second hooking portion 332, the third hooking portion 333, and the fourth hooking portion 334, may not be integrally connected to the wall portion 382. At least one of the hooking portions 330, including the first hooking portion 331, the second hooking portion 332, the third hooking portion 333, and the fourth hooking portion 334, may be a separate member from the wall portion 382, and may be connected to each other via a connecting member (not shown) or the like.

Further, a plurality of notch portions 384 are formed in the wall portion 382. The notch portions 384 penetrate the inner wall surface 382a and the outer wall surface 382b, and are formed by cutting out from the inner wall surface 382a toward the inner ceiling surface 381b in a partial distance.

As shown in FIGS. 13 to 15, notch portions 384 are formed in the wall portion 382 at positions corresponding to the first hooking portion 331 to the fourth hooking portion 334, respectively. An end of the extension portion 335 of the hooking portion 330 is connected to ends of the notch portions 384, bottoms of the notch portions 384, formed in the wall portion 382 at a position corresponding to the hooking portion 330 on a side to the inner ceiling surface 381b.

Figure 21:
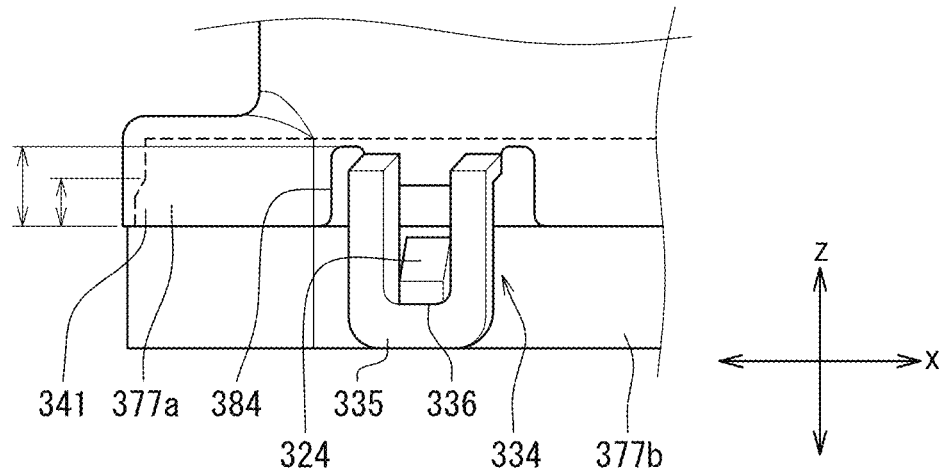
FIG. 21 is a side view explaining the joining configuration of the cover member and the base member.

FIG. 21 shows a form of the fourth notch portion 384 which is formed at a position corresponding to the fourth hooking portion 334. Similarly, the notch portion 384 is formed at a position corresponding to the first hooking portion 331.

Figure 22:
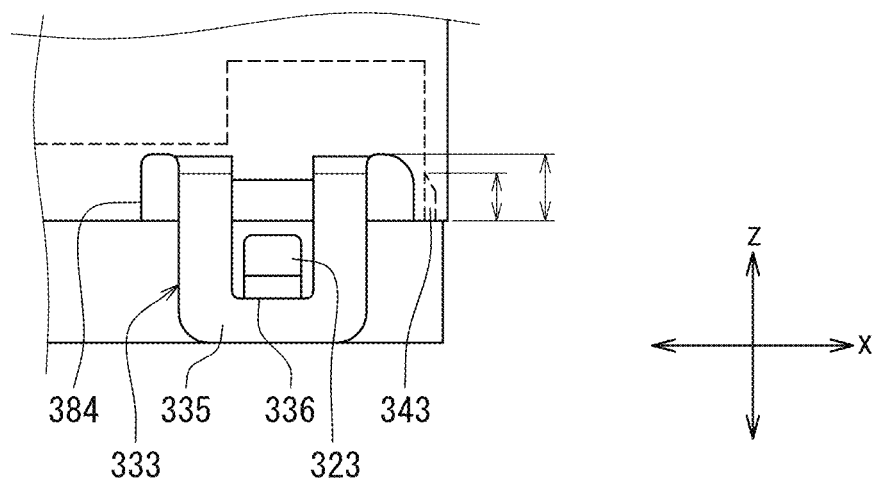
FIG. 22 is a side view explaining the joining configuration of the cover member and the base member.

FIG. 22 shows a form of the third notch portion 384 which is formed at a position corresponding to the third hooking portion 333. Similarly, the notch portion 384 is formed at a position corresponding to the second hooking portion 332.

These notch portions 384 may be cut deeper to a position on a side to the inner ceiling surface 381b than the distal end of the protrusions 340 spaced apart in the z-direction from the third side surface 377c.

<Cover Member and Protrusion>

When fixing the cover member 380 to the base member 370, the cover member 380 is moved toward the base member 370 in the z-direction so that the inner wall surface 382a is placed along the first side surface 377a.

If the cover member 380 is moved toward the base member 370 in the z-direction, the distal end of the wall portion 382 comes in contact with the protrusions 340. As described above, the cover member 380 is made of a member containing resin or the like. The base member 370 is formed from a member containing metal or the like. Furthermore, the protrusions 340 are formed from a member containing metal or the like as well as the base member 370. The protrusions 340 are less likely to be deformed than the cover member 380.

For this purpose, if the cover member 380 is further moved toward the base member 370, a part of the wall portion 382 slides on the protrusion upper portion 344 and then deforms to ride over the protrusion lower portion 345, as shown in FIGS. 17 to 19.

More specifically, if the protrusions 340 are lightly press-fitted into the cover member 380, the wall portion 382 receives a tension in a direction in which the protrusion 340 protrudes. As a result, a part of the cover member 380 is deformed.

Then, as shown in FIG. 17, the protrusion lower portion 345 of the first protrusion 341 comes in contact with the inner wall surface 382a. As shown in FIG. 18, the protrusion lower portion 345 of the second protrusion 342 comes in contact with the inner wall surface 382a. As shown in FIG. 19, the protrusion lower portion 345 of the third protrusion 343 comes in contact with the inner wall surface 382a.

If the cover member 380 is further moved toward the base member 370, the inner wall surface 382a of the wall portion 382 and the third side surface 377c of the base member 370 come in contact with each other. As a result, the base member 370 and the cover member 380 are hermetically sealed. Note that a sealing material or the like may be interposed between the connection wall surface 382c and the third side surface 377c to improve airtightness.

As shown in FIGS. 17 to 20, the first protrusion 341 and the second protrusion 342 protrude away from the first side surface 377a in opposite directions to each other in the x-direction. The first protrusion 341 and the third protrusion 343 protrude away from the first side surface 377a in opposite directions to each other in the x-direction. The second protrusion 342 and the third protrusion 343 protrude in the same direction.

Hereinafter, for simplify an explanation, the direction in which the first protrusion 341 protrudes along the x-direction is referred to as a first direction. The direction in which the second protrusion 342 and the third protrusion 343 protrude along the x-direction is referred to as a second direction.

As described above, each of the first protrusion 341 to the third protrusion 343 is in contact with the inner wall surface 382a. A biasing force in the first direction is applied to the wall portion 382 from the first protrusion 341. A biasing force in the second direction is applied to the wall portion 382 from the second protrusion 342. A biasing force in the third direction is applied to the wall portion 382 from the third protrusion 343.

Operations And Advantages

As described above, the cover member 380 and the base member 370 are fixed in a fitting manner. However, there is a possibility that the cover member 380 and the base member 370 may be displaced due to vibration. In this embodiment, in addition to the fitting of the cover member 380 and the base member 370, the first protrusion 341 to the third protrusion 343 come in contact with the inner wall surface 382a of the wall portion 382 respectively.

For this purpose, the biasing force in the first direction is applied to the wall portion 382 from the first protrusion 341. A biasing force in the second direction is applied to the wall portion 382 from the second protrusion 342. A biasing force in the second direction is applied to the wall portion 382 from the third protrusion 343.

Furthermore, since the first protrusion 341 and the inner wall surface 382a are in contact with each other, each of a frictional forces in the x-direction and a frictional force in the z-direction between them may be easily increased. Since the second protrusion 342 and the inner wall surface 382a are in contact with each other, each of a frictional forces in the x-direction and a frictional force in the z-direction between them may be easily increased. Since the third protrusion 343 and the inner wall surface 382a are in contact with each other, each of a frictional forces in the x-direction and a frictional force in the z-direction between them may be easily increased.

According to this, misalignment between the cover member 380 and the base member 370 may be easily suppressed. Accordingly, abnormal noises caused by the cover member 380 and the base member 370 in contact with each other are less likely to be generated. In addition, a noise generated between the cover member 380 and components around the cover member 380 and a noise generated between the base member 370 and components around the base member 370 are less likely to be generated.

As described above, the first protrusion 341 is provided on a part of the first side surface 377a at one end in the x-direction on a side where the first fastening portion 372a and the fourth fastening portion 372d are provided. The second protrusion 342 and the third protrusion 343 are provided on a part of the first side surface 377a at the other end in the x-direction on a side where the second fastening portion 372b and the third fastening portion 372c are provided. The first protrusion 341 and both the second protrusion 342 and the third protrusion 343 are arranged to be spaced apart from each other in parallel in the x-direction.

As described above, the first connecting unit 311 are provided at one side end in the y-direction on the side where the first fastening portion 372a and the second fastening portion 372b are provided. The second connecting units 312 are provided at the other side end in the y-direction on the side where the third fastening portion 372c and the fourth fastening portion 372d are provided. The first connecting unit 311 and the second connecting unit 312 are arranged to be spaced apart from each other in parallel in the y-direction.

According to this, the wall portion 382 is less likely to receive a tension in the y-direction by the protrusion 340. A misalignment between the anchoring portion 320 and the hooking portion 330 in the y-direction is easily suppressed. Stress is less likely to be applied to a boundary between the extension portion 335 and the wall portion 382 when the anchoring portion 320 and the hooking portion 330 are manipulated to fit together.

As described above, the first protrusion 341 is connected to the first side surface 377a and the third side surface 377c. The second protrusion 342 is connected to the first side surface 377a and the third side surface 377c. The third protrusion 343 is connected to the first side surface 377a and the third side surface 377c. Note that at least one of the protrusions 340, including the first protrusion 341 to the third protrusion 343 may not be connected to the third side surface 377c. The first protrusion 341 to the third protrusion 343 may be connected to the third side surface 377c.

According to this, an end portion of the inner wall surface 382a of the wall portion 382 on a side to the third side surface 377c comes in contact with the protrusion 340. For this purpose, the end portion of the wall portion 382 on a side to the inner wall surface 382a is less likely to move in the planar direction. The inner wall surface 382a and the first side surface 377a are less likely to come in contact with each other. As a result, abnormal noises are less likely to be generated.

Further, the second protrusion 342 is provided on an end of the first side surface 377a in the y-direction on a side where the third defining surface 376c is provided. Further, the third protrusion 343 is provided on an end of the first side surface 377a in the y-direction on a side where the fourth defining surface 376d is provided.

For this purpose, a portion located on a side to the third defining surface 376c among the edges defining the through hole 383 in the wall portion 382 is less likely to move in the planar direction. A portion located on a side to the fourth defining surface 376d among the edges defining the through hole 383 in the wall portion 382 is less likely to move in the planar direction.

Further, a part of a curved portion of the second protrusion 342 is connected to the connection surface 379. A part of a curved portion of the third protrusion 343 is connected to the connection surface 379.

For this purpose, the second protrusion 342 is provided on a part of the first side surface 377a close to the third defining surface 376c. The second protrusion 342 is provided on an end of the first side surface 377a in a circumferential direction of the base member 370. The second protrusion 342 is provided on a part of the first side surface 377a facing a direction in which the connector 390 opens to receive the other paired connector. The second protrusion 342 is provided on a flat part of the first side surface 377a. The second protrusion 342 is provided on an end of the flat part in the y-direction. Therefore, the third protrusion 343 is provided on a part of the first side surface 377a close to the fourth defining surface 376d. The third protrusion 343 is provided on an end of the first side surface 377a in a circumferential direction of the base member 370. The third protrusion 343 is provided on a part of the first side surface 377a facing a direction in which the connector 390 opens to receive the other paired connector. The third protrusion 343 is provided on a flat part of the first side surface 377a. The third protrusion 343 is provided on an end of the flat part in the y-direction.

As described above, the ends of the protrusions 340, including the first protrusion 341, the second protrusion 342, and the third protrusion 343, spaced apart in the z-direction from the third side surface 377c are located on a side to the third side surface 377c than the base upper surface 373a.

According to this, a region of the inner wall surface 382a which comes in contact with the protrusion 340 may be made narrower. Stress is less likely to be applied to the wall portion 382 in the planar direction.

As described above, the wall portion 382 is formed with a notch portion 384 that penetrates the inner wall surface 382a and the outer wall surface 382b and is formed to cut out from the inner wall surface 382a toward the inner ceiling surface 381b. The end of the extension portion 335 of the hooking portion 330 is connected to an end of the notch portions 384 on a side to the inner ceiling surface 381b.

According to this, even if the cover member 380 receives a tension due to the protrusion 340 being lightly press-fitted into the inside of the cover member 380, stress is less likely to be applied to the edge of a boundary between the extension portion 335 and the wall portion 382.

As described above, the notch portions 384 are formed deeper to a position on a side to the inner ceiling surface 381b than the distal end of the protrusions 340 spaced apart in the z-direction from the third side surface 377c.

According to this, stress is less likely to be applied to the boundary between the extension portion 335 and the wall portion 382.

As described above, the distance of the anchoring upper portion 325 from the second side surface 377b increases from a side of the base member upper surface 373a toward a side of the base member lower surface 373b. For this purpose, the distal end of the hooking portion 330 can easily slide on the anchoring upper portion 325. Stress is less likely to be applied to the boundary between the extension portion 335 and the wall portion 382.

As described above, the distance of the protrusion upper portion 344 from the first side surface 377a increases from a side of the base member upper surface 373a toward a side of the base member lower surface 373b. For this purpose, the distal end of the wall portion 382 slides easily on the protrusion upper portion 344. When the protrusions 340 are lightly press-fitted into the cover member 380, stress is less likely to be applied to the wall portion 382.

(First Modification)

Figure 23:
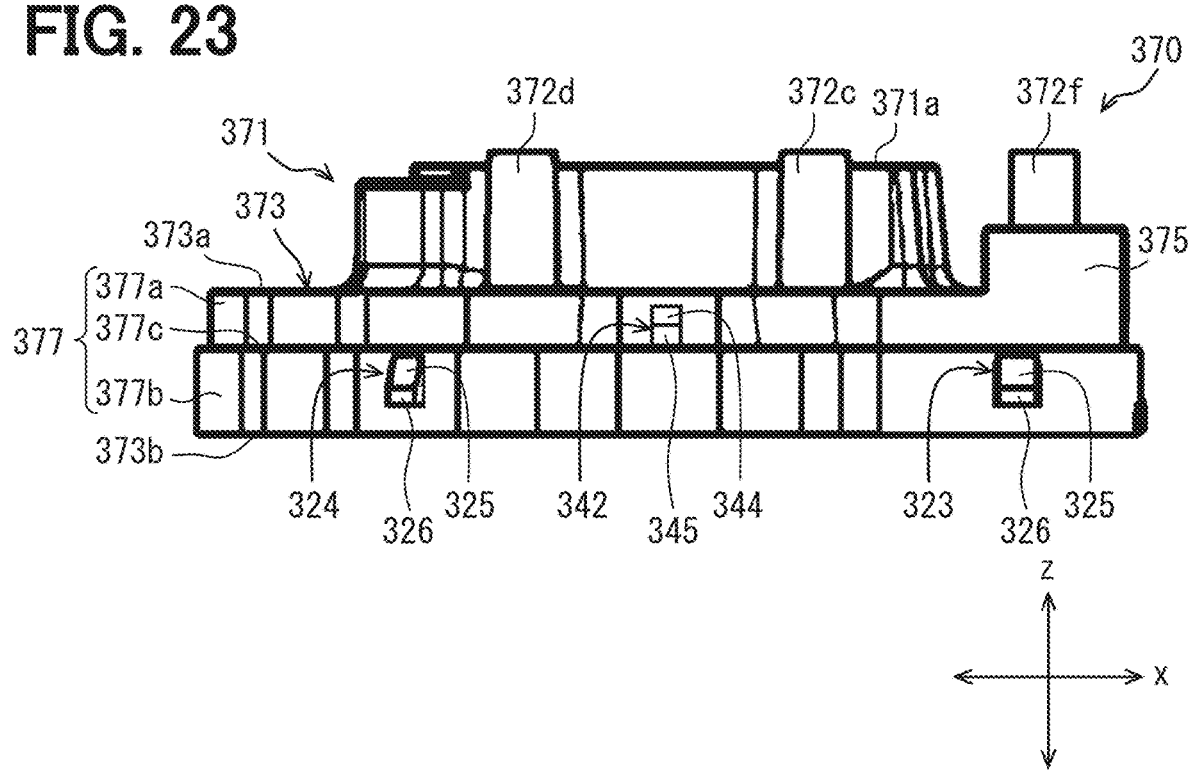
FIG. 23 is a side view explaining a modified example of the protrusion.
Figure 24:
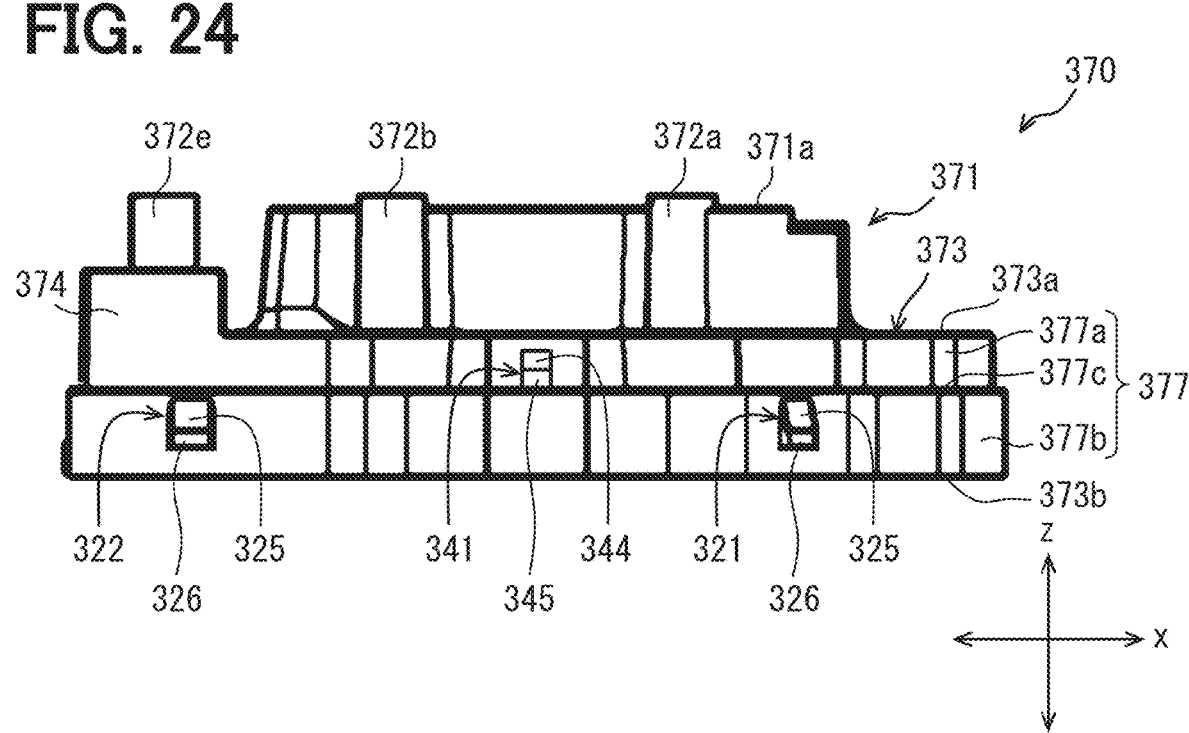
FIG. 24 is a side view explaining the modified example of the protrusion.

The protrusions 340 may not have the first protrusion 341 to the third protrusion 343. As shown in FIGS. 23 and 24, the protrusions 340 may include only the first protrusion 341 and the second protrusion 342.

The first protrusion 341 may be provided on a side of the first side surface 377a where the first fastening part 372a and second fastening part 372b are provided. The second protrusion 342 may be provided on a side of the first side surface 377a where the third fastening portion 372c and the fourth fastening portion 372d are provided. The first protrusion 341 and the second protrusion 342 may be arranged to be spaced apart from each other in parallel in the y-direction.

Further, as shown in FIGS. 23 and 24, the first connecting unit 311 and the second connecting unit 312 are arranged to be spaced apart from each other in parallel in the y-direction.

In this way, a parallel arrangement direction of the plurality of protrusions 340 and a parallel arrangement direction of the plurality of connecting units 310 may be the same. Even in that case, misalignment between the cover member 380 and the base member 370 may be easily suppressed.

(Second Modification)

Figure 25:
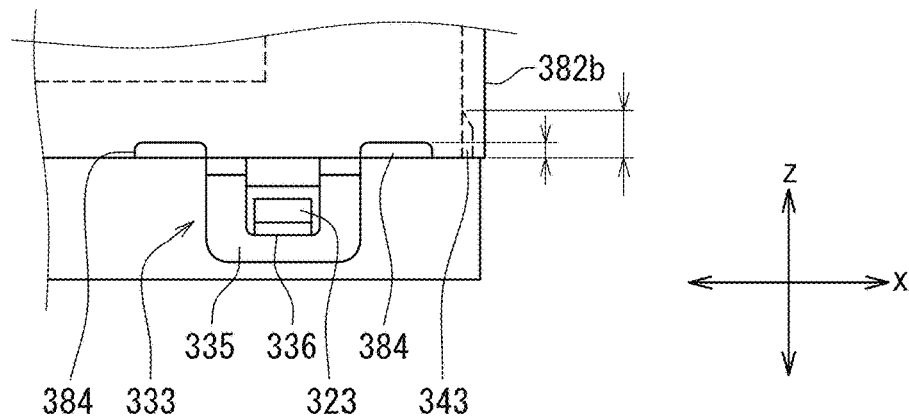
FIG. 25 is a side view explaining the modified example of a notch.

As shown in FIG. 25, the notch portions 384 may be cut shallower than a height of the protrusion 340, which is defined as a distance from the third side surface 377c to a distal end of the protrusion 340 in the z-direction. In other words, the notch portions 384 may be shallower than the distal end of the protrusion 340 in the z-direction. According to this structure, even the notch portions 384 are cut shallower than the distal end of the protrusion 340 distanced from the third side surface 377c in the z-direction, it is less likely to apply stress to ends of a boundary between the extension portion 335 of the hooking portion 330 and the wall portion 382. Note that in FIG. 25, some components of the base member 370 are omitted.

(Third Modification)

Figure 26:
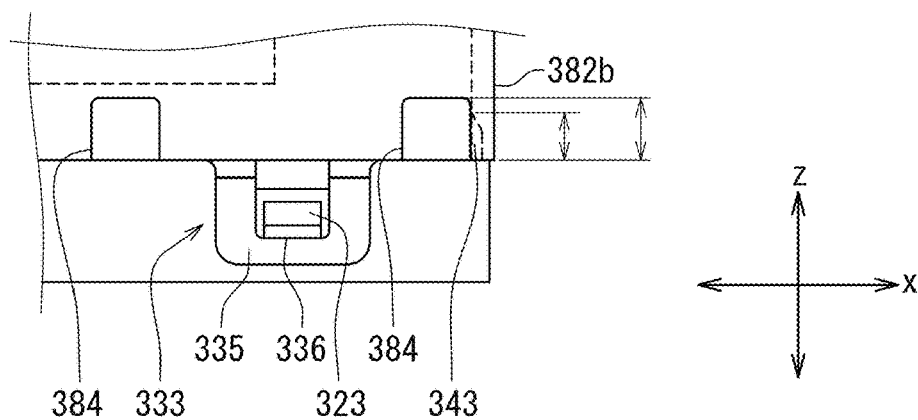
FIG. 26 is a side view explaining the modified example of the notch.
Figure 27:
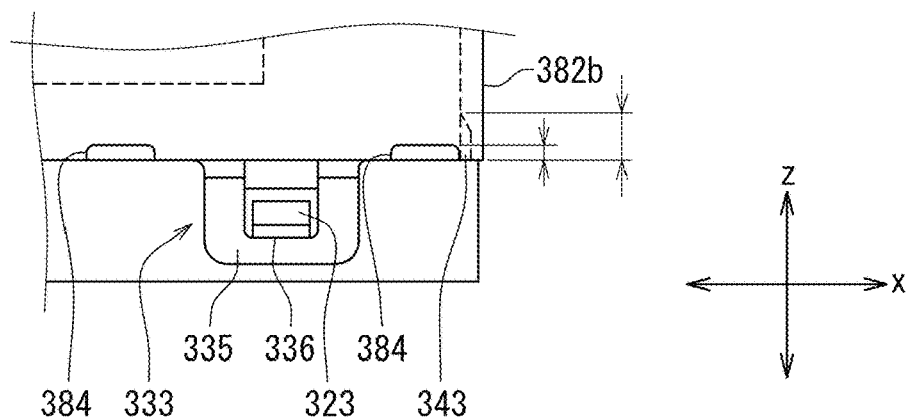
FIG. 27 is a side view explaining the modified example of the notch.

As shown in FIGS. 26 and 27, the notch portions 384 may be formed on a position between a portion of the wall portion 382 abutting on the projection 340 and a portion of the wall portion 382 where the hooking portion 330 is provided. Note that in FIGS. 26 and 27, some components of the base member 370 are omitted.

Note that the notch portions 384 may be cut deeper to a position on a side to the inner ceiling surface 381b than the distal end of the projection portion 340 spaced apart in the z-direction from the third side surface 377c, or may be cut shallower to the position. If the notch is cut deeper than the position, stress is less likely to be applied to the boundary between the extension portion 335 of the hooking portion 330 and the wall portion 382. If the notch is cut shallower than the position, stress is less likely to be applied to the boundary between the extension portion 335 of the hooking portion 330 and the wall portion 382.

As explained above, a drive device 350 of a motor is provided. The drive device 350 comprises an electric component 360, a base member 370 and a cover member 380. The base member 370 is an end component of the motor. The base member 370 and the cover member 380 forms a cavity which accommodates the electric component 360. The base member 370 and the cover member 380 are connected by a plurality of connecting portions 310 each of which includes a hooking portion 330 and an anchoring portion 320. The connecting portions 310 include a plurality of pairs of the connecting portions 310. At least one of the pairs are arranged in pair directions perpendicular to the longitudinal direction. The protrusions 340 includes a first protrusion 341 and a second protrusion 342, 343 protruding outwardly. The first protrusion 341 and the second protrusion 342, 343 protrude in an opposite direction.

The plurality of protrusions 340 and the plurality of connecting portions 310 are located on different positions from each other in a circumferential periphery of the drive device 350 about the z-direction. In other words, the plurality of protrusions 340 are located on positions shifted in a circumferential direction about the z-direction from the plurality of connecting portions 310. The cover member 380 is deformed to be placed on the plurality of protrusions 340. In other words, the cover member 380 is deformed to cover over the plurality of protrusions 340. As a result, a deformation of the cover member 380 and the protrusion 340 is less likely affect a deformation of the connecting portion 310, i.e., a deformation of the hooking portion 330.

In a manufacturing process or assembling method of the drive device 350, first the base member 370 is placed on a beginning position able to insert into an inner hollow space of the cover member 380. At this very first stage of insertion process, the protrusions 340 are still located on an outside of the cover member 380. The base member 370 and the cover member 380 are easily placed on a proper position with a loose fitting without tight insertion. Subsequently, the base member 370 is gradually inserted into the cover member 380.

Then, before reaching a final position, the protrusions 340 abut an inner surface 382 of the cover member 380. The protrusions 340 further inserted into the cover member 370 and gradually deforms the cover member 380 in a radial outside direction. In another viewpoint, the protrusions 340 further inserted into the cover member 380 and gradually deforms the cover member 380 in a longitudinal direction of the cover member 380. The protrusions 340 provide a tight inserting feeling for an assembling worker or require a higher inserting force for an assembling machine at an ending half phase of an insertion process.

Before reaching a final position, the plurality of connecting portions 310 are elastically deformed to connect the base member 370 and the cover member 380. In an ending phase of the insertion process, the hooking portions 330 are gradually deformed on the anchoring portion 320, respectively. The hooking portions 330 are deformed in directions other than the longitudinal direction. In this stage, since the connecting portions 310 are located on shifted positions from the protrusions 340, it is possible to reduce an adverse deformation of the cover member 380 and the hooking portions 330. Finally, the hooking portions 330 receive the anchoring portions 320 into the hooking portions 330, respectively.

Finally, the cover member 380 and the base member 380 reach the final position and are fixed by the plurality of connecting portions 310. As a result, a tight fitting of the base member 370 and the cover member 380 by the protrusions 340 enable sure engagement of at least one pair of the anchoring portion 320 and the hooking portion 330.

It should be understood that the present disclosure described based on the embodiments is not limited to the embodiments or structures presented herein. The present disclosure encompasses various modified examples and modifications within an equivalent scope. In addition, although various combinations and modes are shown in the present disclosure, other combinations and modes including only one element, more elements, or less elements are also within the scope and idea of the present disclosure.

What is claimed is:

1. A drive device, comprising:
   an electrical component which controls an electric motor;
   a base member which includes an arrangement surface on which the electrical component is arranged and a side surface extending annularly around a first parallel arrangement direction in which the arrangement surface and the electrical component are arranged;
   a cover member which includes a top portion having an inner ceiling surface facing the electrical component in the first parallel arrangement direction and a wall portion having an inner wall surface extending annularly around the first parallel arrangement direction in a vertically extending manner from the inner ceiling surface in the first parallel arrangement direction;
   a connecting unit which connects the base member and the cover member in a fitting manner; and
   protrusions which are disposed on the side surface, and are less deformable than the wall portion, wherein
   the protrusions include a first protrusion and a second protrusion protrude in parallel in an opposite direction each other on a second parallel arrangement direction along a plane perpendicular to the first parallel arrangement direction so as to come in contact with the inner wall surface.

2. The drive device according to claim 1, wherein
   the wall portion includes an outer wall surface which is arranged in parallel with the inner wall surface on a planar direction perpendicular to the first parallel arrangement direction, and a connecting wall surface which is spaced apart from the inner ceiling surface in the first parallel arrangement direction and connects the inner wall surface and the outer wall surface, and wherein the connecting unit includes:
   a base member side fitting portion disposed on the side surface and;
   a cover member side fitting portion which is connected to a side of the connecting wall surface of the wall portion and extends to be distanced from the inner ceiling surface in the first parallel arrangement direction, and wherein
   the base member side fitting portion includes a first fitting portion and a second fitting portion arranged in parallel in a third parallel arrangement direction different from the second parallel arrangement direction in the planar direction, and wherein the cover member side fitting portion includes a third fitting portion fitted with the first fitting portion and a fourth fitting portion fitted with the second fitting portion.

3. The drive device according to claim 2, wherein the side surface includes:

a first side surface which is away from the inner ceiling surface than the arrangement surface in the first parallel arrangement direction and on which the protrusion is provided;

a second side surface which is away from the arrangement surface than the first side surface in the first parallel arrangement direction, is away from the arrangement surface than the first side surface in the planar direction, and on which the base member side fitting portion is provided; and a third side surface which connects the first side surface and the second side surface and is arranged with the connecting wall surface in parallel in the first parallel arrangement direction, and wherein the protrusion is provided on the first side surface and the third side surface.

4. The drive device according to claim 3, wherein a distal end of the protrusion on a side to the inner ceiling surface in the first parallel arrangement direction is located on a position on a side to the third side surface than the arrangement surface in the first parallel arrangement direction.

5. The drive device according to claim 2, wherein the wall portion is formed with a notch portion cut out from the connecting wall surface toward the inner ceiling surface.

6. The drive device according to claim 5, wherein an end of the cover member side fitting portion is engaged with an end of the notch portion on a side to the inner ceiling surface in the first parallel arrangement direction.

7. The drive device according to claim 5, wherein the notch portion is formed on a portion between a portion where the protrusion abuts on the wall portion and a portion where the cover member side fitting portion is disposed on the wall portion.

8. The drive device according to claim 5, wherein an end of the notch portion on a side to the inner ceiling surface in the first parallel arrangement direction is located on a side to the inner ceiling surface in the first parallel arrangement direction than an end of the protrusion on a side to the inner ceiling surface in the first parallel arrangement direction.

* * * * *